US011475071B2

(12) United States Patent
Kligman et al.

(10) Patent No.: US 11,475,071 B2
(45) Date of Patent: Oct. 18, 2022

(54) CONFIGURING DYNAMIC CONTENT PREVIEWS

(71) Applicant: salesforce.com, inc., San Francisco, CA (US)

(72) Inventors: Sam Kligman, Oakland, CA (US); Jinal Kathiara, Walnut Creek, CA (US)

(73) Assignee: salesforce, inc., San Francisco, CA (US)

( * ) Notice: Subject to any disclaimer, the term of this patent is extended or adjusted under 35 U.S.C. 154(b) by 108 days.

(21) Appl. No.: 16/370,391

(22) Filed: Mar. 29, 2019

(65) Prior Publication Data

US 2020/0311135 A1 Oct. 1, 2020

(51) Int. Cl.
*G06F 16/904* (2019.01)
*H04L 9/40* (2022.01)
*G06F 16/957* (2019.01)
*G06F 16/908* (2019.01)
*G06F 16/909* (2019.01)

(52) U.S. Cl.
CPC .......... *G06F 16/904* (2019.01); *G06F 16/908* (2019.01); *G06F 16/909* (2019.01); *G06F 16/9574* (2019.01); *H04L 63/10* (2013.01)

(58) Field of Classification Search
CPC .... G06F 16/904; G06F 16/908; G06F 16/909; G06F 16/9574; H04L 63/10
See application file for complete search history.

(56) References Cited

U.S. PATENT DOCUMENTS

| | | | | |
|---|---|---|---|---|
| 7,958,459 B1* | 6/2011 | Mahmood | ............. | G06F 16/248 715/808 |
| 8,533,628 B2* | 9/2013 | Rohrabaugh | ........... | H04L 67/04 715/815 |
| 8,806,325 B2* | 8/2014 | Decker | ............... | G06F 16/9577 715/230 |
| 9,087,061 B2* | 7/2015 | Robbin | ................. | G06F 16/954 |
| 10,733,370 B2* | 8/2020 | Owens | .................. | G06F 40/106 |
| 2004/0205358 A1* | 10/2004 | Erickson | ............. | H04L 63/0428 726/33 |
| 2011/0131180 A1* | 6/2011 | Tuli | ..................... | G06F 16/4387 707/610 |
| 2014/0136973 A1* | 5/2014 | Kumar | ................ | G06F 16/9574 715/274 |
| 2016/0092245 A1* | 3/2016 | Hogue | .................. | G06F 3/0482 715/711 |

(Continued)

*Primary Examiner* — Adam M Queler
*Assistant Examiner* — Erik V Stitt
(74) *Attorney, Agent, or Firm* — Holland & Hart LLP

(57) ABSTRACT

A cloud platform supports an object preview service. A user may configure a data object preview, and the object preview service stores a set of instructions for the data object in a preview library. The object preview is associated with a unique identifier, which is associated with an identifier of the preview library. The object preview service may receive requests from client systems, and the request may indicate a data object. The object preview service identifies the set of instructions based on user interface (UI) configurations of the client system and the request. The object preview service transmits the instructions to the client system, which outputs the data object preview at a UI according to the instructions.

20 Claims, 14 Drawing Sheets

(56) References Cited

U.S. PATENT DOCUMENTS

| | | | |
|---|---|---|---|
| 2016/0154644 A1* | 6/2016 | Chhawchharia | G06F 9/44542 717/107 |
| 2016/0259840 A1* | 9/2016 | Zheng | G06Q 30/0269 |
| 2017/0364212 A1* | 12/2017 | Shi | G06F 3/0484 |
| 2018/0083980 A1* | 3/2018 | Bond | G06F 21/6245 |
| 2019/0005571 A1* | 1/2019 | Cho | G06Q 30/0206 |
| 2019/0102472 A1* | 4/2019 | Van Rensburg | G06Q 10/101 |
| 2019/0213342 A1* | 7/2019 | Acharya | G06F 40/106 |
| 2020/0092337 A1* | 3/2020 | Ojha | H04L 63/105 |
| 2020/0201818 A1* | 6/2020 | Khajuria | G06F 16/176 |
| 2020/0259670 A1* | 8/2020 | Mithal | G06Q 30/0601 |

* cited by examiner

CONFIGURING DYNAMIC CONTENT PREVIEWS

FIELD OF TECHNOLOGY

The present disclosure relates generally to database systems and data processing, and more specifically to configuring dynamic content previews.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A database system may store data objects, such as objects corresponding to contacts or business data, and the objects may be requested by external client systems (e.g., chat applications, client devices, etc.). Current systems may define a static view (e.g., card) or display including the requested object or the system may respond with unstructured data, which may be rendered according to the user interface (UI) configurations of the client system. Thus, requested data is statically rendered based on the server (e.g., database system) or based on the functionality of the client system. Current systems do not support dynamic and customizable data preview displays in external client systems.

DETAILED DESCRIPTION

Figure 1:
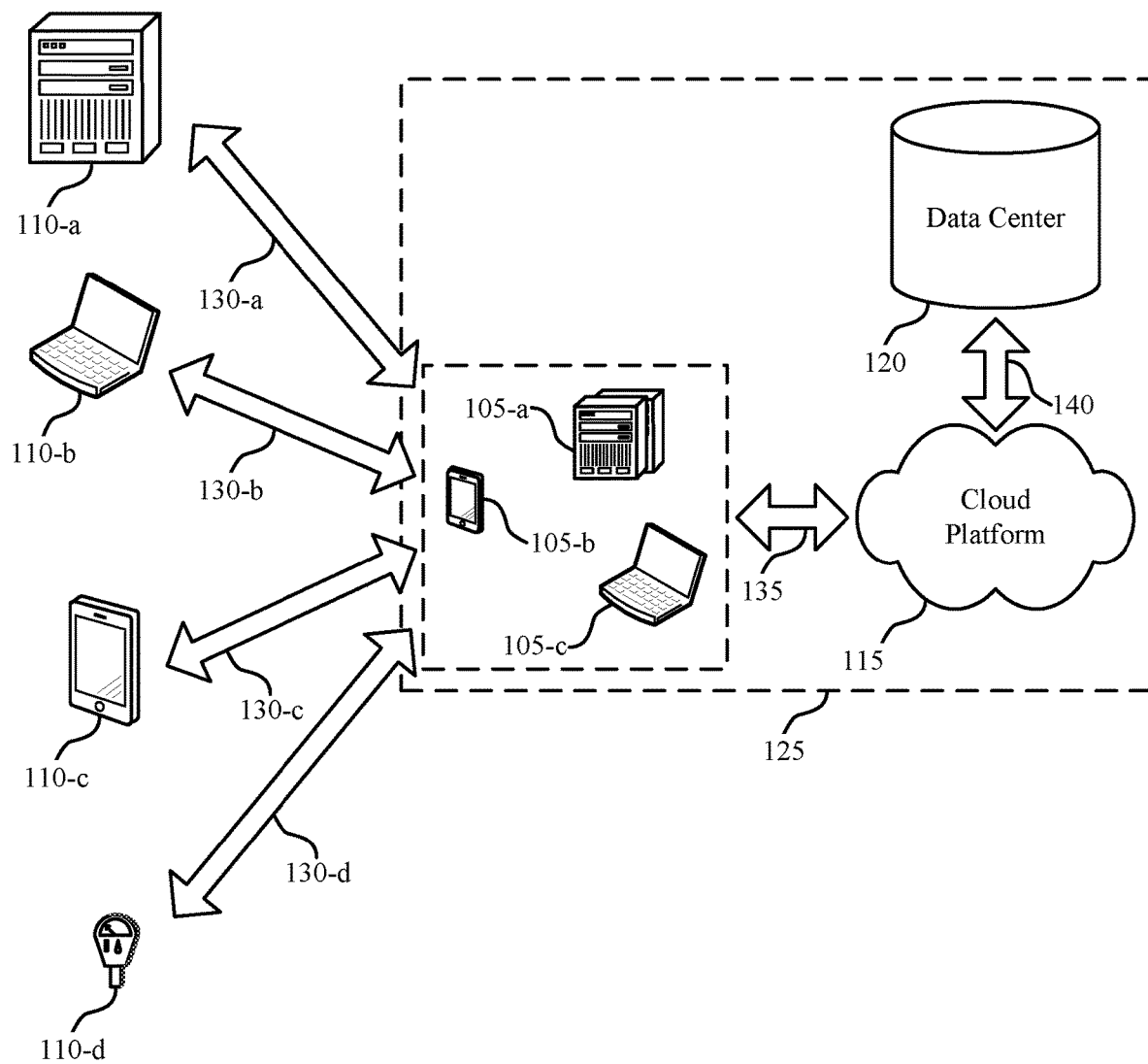
FIG. 1 illustrates an example of a system for data processing that supports configuring dynamic content previews in accordance with aspects of the present disclosure.

A cloud platform supports a configurable and dynamic preview service. Aspects of the disclosure provide for an object preview service allowing for previews of objects to be defined at the database system. The preview service provides generally consistent views of the data, while also being dynamic based on the client system type, the authentication of the client system and/or users of the client system. A user may define a preview of an object (e.g., contact), and the server may store the instructions corresponding to the preview in a preview library. The preview library is associated with a unique identifier (e.g., a uniform resource locator (URL)). When a client system transmits a request to the URL or associated URL, the server identifies the respective preview instructions based on the client system and the request and transmits the instructions to the client system for display. The service allows for different previews to be defined and/or rendered based on the authentication level of the users of the client system. For example, a simple preview may be displayed for a guest user, and a full preview may be displayed for an authenticated user. As an example use of the system, a user may post a link to a contact in a chat application instance, and the chat application provides a button which allows the user to view more. If the user clicks the button, a dynamic contact "card" is displayed in the chat instance, and the user may take "action" using the displayed card (e.g., the card has functionality rather than being a static card display).

An administrator may design one or more previews at a user interface supported by the preview service. The designing may include dragging/dropping, sizing, customizing, grouping, etc. a set of preconfigured components (e.g., fields, buttons, text boxes, graphs). A designed preview may correspond to a particular object type, such as a contact, business, sales data, interaction data, etc., and many instances of an object type may be stored at a database system. Instructions defining the preview (e.g., rendering instructions) are stored at a preview library of the database system. The preview library may correspond to a particular user, organization, etc., and the preview library may be associated with an identifier, such as a URL. Each preview of the preview library may have a corresponding identifier, which is associated with the identifier of the library. The service may further include a default set of instructions corresponding to different preview types, such that an administrator is not required to define preview components for certain object types.

Because the service provides rendering instructions for requestable data objects, the client side applications, devices, or servers, may not need to be configured for rendering unstructured data. Rather, client side systems may be configured to request the particular URL for a preview library based on inputs by users. Accordingly, client side systems do not waste computing resources determining or generating rendering instructions for different requested data. Further, administrators of the requestable data may define consistent previews for varying different client system types such that the data is rendered consistently across the different client system types. Administrators of the client systems may configure authentication levels for certain users such that users may view or interact with different data.

A client application, device, or a server supporting the application or device, which collectively may be referred to as a client system, may transmit a request using the URL of the library, a renderable preview of the library, etc. Based on the request and the status (e.g., the client system type, a UI configuration of the client system), the preview service supported by the database system may identify a corresponding set of instructions defining the renderable preview of a requested object. The instructions may include fields populated with data of the requested data object. The server may transmit the set of instructions including the populated fields for display at the application, device, etc.

In some cases, the administrator may design, or the service may have default instructions configured for, different authentication levels of the client system and/or users of the client system. Accordingly, when a client system requests a data object using a URL, the database system may identify the set of instructions based on the authentication level of the user or the client system. For example, a guest level of authentication for a user or client system is served with a set of instructions including a subset of the data corresponding to a requested data object, while a fully authentication user or client system is served with a full set of the data of the requested data object.

Aspects of the disclosure are initially described in the context of an environment supporting an on-demand database service. Aspects of the disclosure are further described in the context of an operating environment, a block diagram, and a process flow diagram Aspects of the disclosure are further illustrated by and described with reference to apparatus diagrams, system diagrams, and flowcharts that relate to configuring dynamic content previews.

FIG. 1 illustrates an example of a system 100 for cloud computing that supports configuring dynamic content previews in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may further support an object preview service. The object preview service may provide default rendering instructions for different data object types stored at the data center 120. Further, the object preview service may support a user interface in which administrators may design data object previews for different data object types. For example, an administrator for a cloud client 105 may design previews for different data objects, which may correspond to users for particular contacts 110. Accordingly, when users associated with the cloud client 105 request data objects corresponding to the contacts 110 using different client systems (e.g., chat services, smart devices, mobile devices, etc.), the cloud platform 115 may serve the requested data object (e.g., a dynamic preview card), which is rendered at the client system based on rendering instructions identified based on the request and the requesting client system.

In conventional data preview systems, a user or device (e.g., based on a user input) may request or submit a query for information, and the client device may serve responsive data based on the configuration of the client. As a specific example, a user may query a virtual assistant (e.g., Siri, Google) for information about a particular topic, and the virtual assistant may trigger a search at a search server. The virtual assistant may surface a preview or snippet of retrieved information at a display. The preview or snippet may be generated based on the configuration of the client system (e.g., Apple device). However, this example requires substantial configuration at the client systems (e.g., a UI experience is built) and/or is limited to a static content view.

In accordance with aspects of the present disclosure, the cloud platform 115 provides a content preview service which provides customizable content previews which are served to client systems responsive to requests. Aspects of the present disclosure provide for very little or no configuration of the client systems themselves. Rather, the content preview service provides a preview library, which may be associated with an identifier (e.g., a URL). The client system may transmit a request to the content preview service based on an identifier associated with the preview library, and the service identifies and serves a set of rendering instructions to the client based on the request and the requesting client system. Accordingly, different data objects may be served to the client systems and displayed based on configurations stored at the cloud platform 115. As such, client systems are not required to configure display elements for various object types and are also not required to store UI configurations.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As an example, employees or persons associated with an organization (e.g., a cloud client 105) may utilize Slack for internal communications. An administrator of the Slack workspace for the organization may utilize the object preview service of the cloud platform 115 to configure manners in which linked data is displayed to users of the workspace. The administrator may specify that when a URL matching a certain pattern is identified (e.g., "Salesforce.com/contact/ . . . "), the Slack service may transmit a request to a URL of a preview library associated with the organization or workspace. The configured preview may correspond to a "contact" so that contacts are displayed in a certain way according to the configurations by the administrator. The preview library is supported by the object preview service, and the service identifies the preview instructions corresponding to the requested object type (e.g., contact) as well as for the specific requesting client (e.g., Slack) and serves the instructions back to the Slack client. The Slack client displays the data (e.g., a contact card) corresponding to the requesting object based on the instructions.

Figure 2:
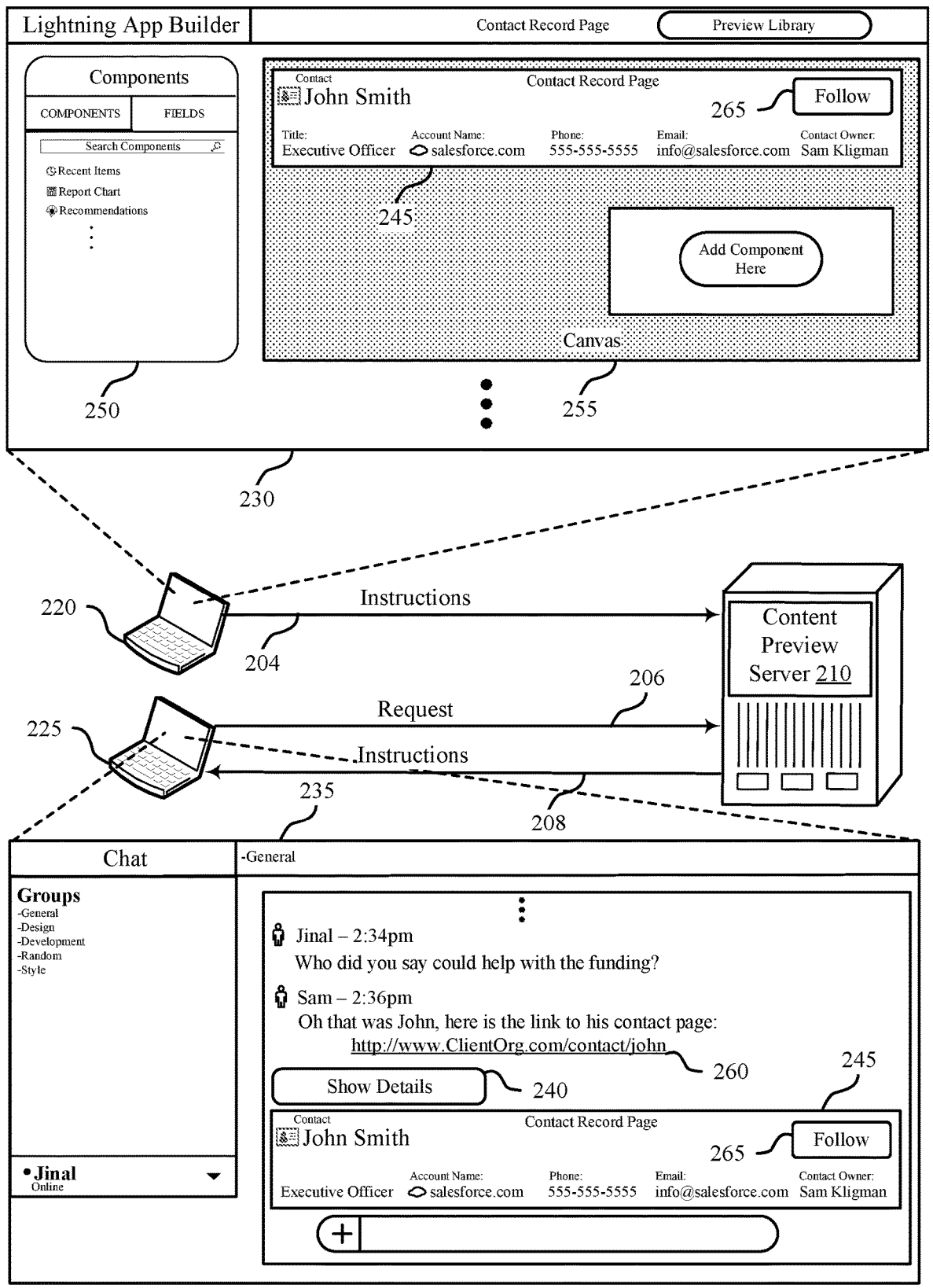
FIG. 2 illustrates an example of an environment that supports configuring dynamic content previews in accordance with aspects of the present disclosure.

FIG. 2 illustrates an example of an environment 200 that supports configuring dynamic content previews in accordance with aspects of the present disclosure. The environment 200 may implement aspects of the system 100 of FIG. 1. For example, the environment 200 includes an object preview server 210, which may be an example of aspects of cloud platform 115 of FIG. 1, and user devices 220 and 225, which may be examples of devices associated with a cloud client 105 of FIG. 1.

At user device 220 a user or administrator (e.g., of a cloud client 105) may access a UI 230 supported by the object preview server 210. The user or administrator may configure a content object preview 245 for a contact data object type. The user may drag and drop different components and fields from pane 250 to canvas 255 to generate the preview 245. The preview 245 includes fields corresponding to data (e.g., title, account name, phone number, email, contact owner) of the contact data object type. The fields may be linked to the data of the data object such that when a specific object of the data object type is requested, the fields are populated to include the data.

In some cases, the user or administrator may configure different previews 245 for different client systems (e.g., chat services, email systems, mobile smart devices, smart home devices) as well as for different authentication levels. For example, the cloud client 105 may maintain data objects (e.g., contacts) that may be publicly accessible. Accordingly, the administrator may configure a guest level preview for different client systems in which users may view a preview of data objects. Because of the guest level authentication, the preview may show a subset of the data (e.g., a name and title but not email or phone number). The client systems may be authenticated at the object preview server 210 using an endpoint (e.g., application programming interface (API) endpoint) exposed by the object preview server 210. The client system may be authenticated as a guest authentication level, full authentication level, or some other authentication level.

Based on the configuration by the administrator at the UI 230, a set of preview instructions 204 defining the preview 245 are stored in a preview library supported by the object preview server 210. The preview library may be associated with an organization, a particular client system used by the organization, etc. In the illustrated example, the administrator configures a contact object preview for utilization in a chat system, such as Slack. The administrator may further configure the chat application (e.g., using administrative rights) to trigger requests to the preview library based on inputs by users of the chat application. For example, the chat application may be configured to transmit a request to the preview library when certain URLs or URL patterns are posted in the chat application. As a specific example, the administrator configures the chat application to transmit a request to the preview library when a posted URL has the pattern "ClientOrg.com/contact/ . . . ," such that instructions corresponding to the contact preview 245 are returned responsive to the request.

In FIG. 2, a user "Jinal" is utilizing a chat application (e.g., Slack) with a UI 235 at user device 225. The user enters a question, which is answered by another user, "Sam." Sam enters a link 260, which includes the pattern "ClientOrg.com/contact/." The link also includes an identification of a data object (e.g., "John"). The chat application may detect the pattern in the link based on the administrator configurations, and transmit a request 206 to the object preview server 210 using the identifier of the preview library (e.g., URL). The request 206 may also include the identification of the contact. In response, the object preview server 210 may identify the set of instructions corresponding to the requested object. The identification may be based on the requesting client system (e.g., chat application) as well as information included in the request (e.g., object type and other headings). The object preview server 210 may populate fields in the instructions with data corresponding to the requested object (e.g., information associated with the John contact). The object preview server 210 may transmit the instructions 208 defining the object preview 245 to the chat application for display at the UI 235.

In some cases, the chat application detects the pattern in the link 260 and displays a user interface control 240 which includes the text "Show Details." If a user clicks or otherwise activates the user interface control 240, then the chat application may display the object preview 245. In some cases, activation of the control 240 triggers the request 206 to the object preview server 210.

As noted, object previews 245 may be defined (e.g., default configurations or custom configurations) for different authentication levels of client systems and/or users of the client system. For example, users of the chat application may have different authentication levels (e.g., guest or full authentication levels). Accordingly, when the link is posted and/or the control 240 is activated, then the set of instructions 208 may include different instructions for different authentication levels for users. Thus, Jinal may view a full object preview 245, while another user, with less authentication, may view a preview with different fields (e.g., showing name and title but not phone number, email address). In other cases, the different instructions for the different authentication levels may be selected by the object preview server 210 based on the request 206. For example, the client system may be configured to include headers in the request 206 and the headers may identify which authentication levels to use to identify the preview instructions. In another example, the client system may be authenticated to an API exposed by the client preview server 210, and a fully authentication client system may receive a first set of instructions while a guest authenticated client system may receive a second different set of instructions from the object preview server 210.

In some cases, the displayed data object may include actionable content. In the example illustrated in FIG. 2, the preview 245 includes UI control 265 as actionable content. The actionable content may be linked to operations executable by the object preview server 210 or associated systems. Upon activation of the actionable content, the client system may transmit an additional request 206 or transmission to the object preview server 210. In response to the activation, the object preview server 210 may execute operations associated with the actionable content. The UI control 265 is associated with a "follow" operation. Accordingly, if Jinal activates the control 265, then the object preview server 210 may execute operations associated with the follow button, which may include associating a user account for Jinal with an account or object associated with the contact, John Smith.

It should be understood that the implementations described herein are applicable to many different client system types, including and without limitation, smart speakers and other smart home devices, email clients, websites, search systems, mobile devices, intelligent virtual assistants (e.g., Siri, Google, Cortana), or a combination thereof. For example, a user may request business data from a Google Home device by saying "Google—how much money do stores in our east coast territory bring in?" The indicated stores may correspond to stores of a cloud client 105 of FIG. 1, for example. Based on the input, the Google Home device may transmit a request 206 (based on a device configuration or function) to the object preview server 210. The object preview server may store a set of instructions for generating a response to the query. The set of instructions may function to identify the data for responding to the query. In this specific example, the instructions may cause retrieval of sales data from each store, then the data from stores outside an east coast territory may be filtered, and the remaining sales totals are summed. Further, the instructions may also indicate a response technique. In this specific example, because the response will be displayed and/or broadcast at a smart speaker, the instructions facilitate audible rendering of the data. If the smart device includes a display screen, then the identified instructions may include a display of the data in graph form, for example. In some cases, the object preview server 210 may include machine learning functionality to identify the relevant data.

In the above smart speaker example, the actionable content may include a response to the broadcast data. If the speaker indicates a response to the above example query as "The sales for the stores in the east coast territory are about $3.8 million," then the user may respond by saying "Can you show me the same data without the stores in North Carolina?" The responsive query is a form of actionable content, and the query triggers another request 206 to the object preview server 210. The responsive request may trigger execution of one or more operations at the object preview server 210, which may include recalculation of the sales data based on the responsive query.

In some cases, the input that triggers the request 206 may correspond to contextual data associated with a user. As a specific example, a client system may monitor calendar data associated with a user. Based on the calendar data, the client system may detect a meeting with a contact (e.g., a contact 110), and responsive to the detection, the client system may request data associated with the contact (e.g., contact data, purchasing data, etc.). The object preview server 210 may identify and transmit instructions 208 as a response to the request 206. The client system may display the data object based on the instructions when the client at a scheduled time or responsive to detection of the user in proximity of the device, for example. The client systems may use machine learning functionality to infer, detect, and digest user data for generation of requests 206.

Figure 3:
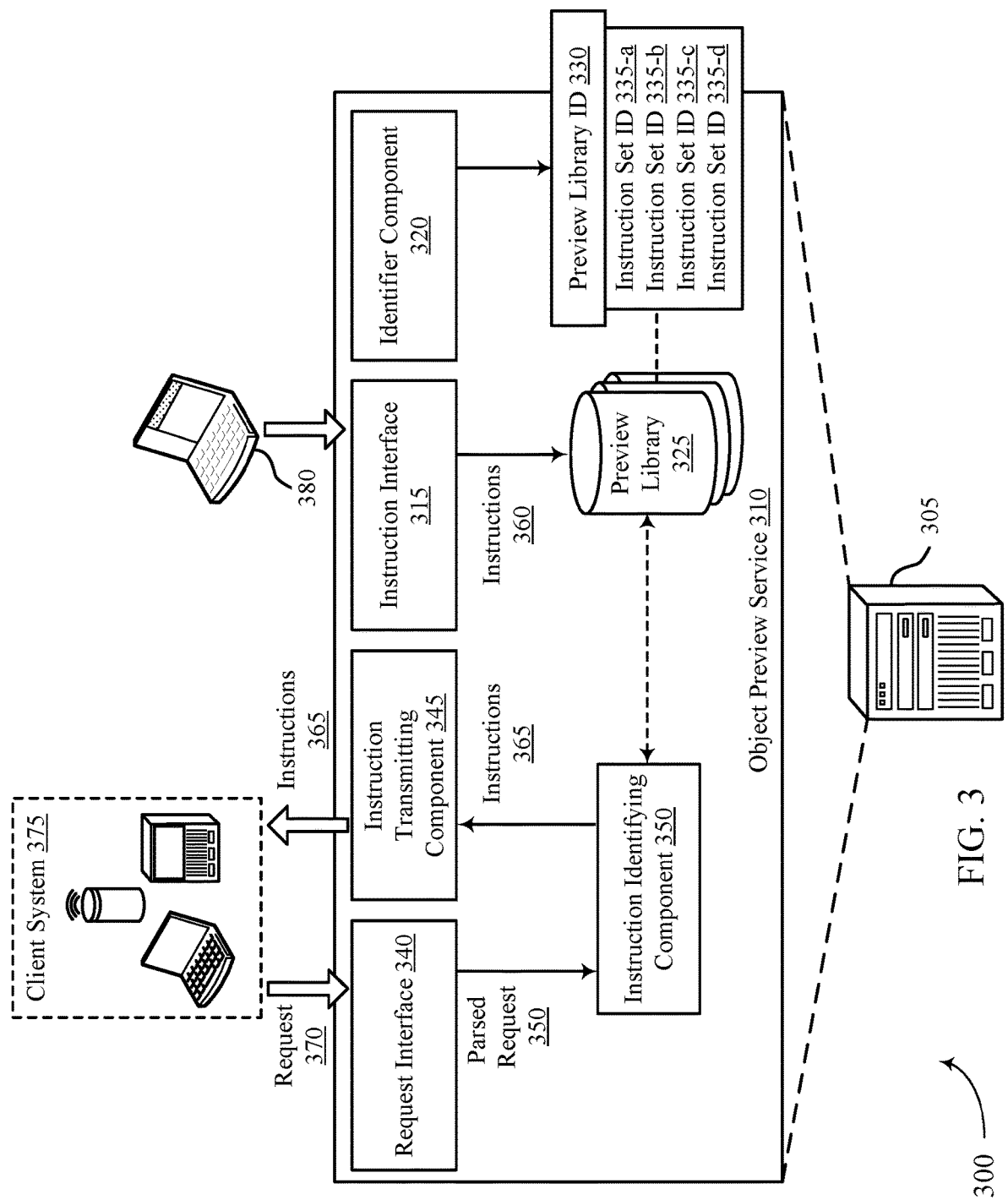
FIG. 3 illustrates an example of a block diagram of devices that support configuring dynamic content previews in accordance with aspects of the present disclosure.

FIG. 3 illustrates an example of a block diagram 300 of devices that support configuring dynamic content previews in accordance with aspects of the present disclosure. The devices of block diagram 300 may implement aspects of the system 100 of FIG. 1 and/or system 200 of FIG. 2. The block diagram 300 includes a server 305, which may be an example of aspects of the server 210 of FIG. 2, and the server 305 executes an object preview service 310. The block diagram 300 further includes a user device 380, which transmits a set of instructions to the server 305. The set of instructions may be transmitted responsive to a user configuring an object preview using a user interface supported by the server 305. An instruction interface 315 of the server 305 receives the instructions 360. The instructions 360 are stored in a preview library 325 managed by the object preview service 310. In some cases, the server 305 is a multi-tenant database system, and as such, manages different preview libraries 325 for different clients (e.g., cloud clients 105 of FIG. 1).

Each preview library may be associated with a preview library identifier 330, which is managed by an identifier component 320 of the service 310. In some cases, the identifier is a URL. When the instructions 360 are stored in the corresponding preview library, the identifier component 320 generates a unique identifier 335 for the instruction set. Accordingly, a particular preview library may include instruction sets for many different object types (e.g., contact data objects, business data objects, etc.) and for many different client system types (e.g., smart speakers, mobile devices, text chat applications, video chat applications, etc.). Each set of instructions may be associated with a unique identifier 335.

The object preview service 310 receives a request 370 from a client system 375, which may be examples of devices associated with cloud client 105 of FIG. 1. Example client systems 375 include computing devices, smart devices, virtual assistants, etc., and the client systems 375 may include servers supporting such systems (e.g., search servers, application servers, etc.). The request may be transmitted responsive to an input by a user at one of the client systems, and the request may include an identifier 330 for a preview library 325 as well as an identifier for a data object. The request 370 may be received at a request interface 340, which may parse the request to identify the indicated preview library, the data object, and a client system type.

An instruction identifying component 350 of the object preview service 310 receives the parsed request and identifies a set of instructions 365 corresponding to the request and UI capabilities of the client system 375. For example, if the request indicates a contact data object type and the client system 375 is a chat application, then the instruction identifying component 350 may identify instructions 365 for rendering a contact card at the client system. The instructions are transmitted to the client system 375 by an instruction transmitting component 345. The client system 375 outputs the data object at a user interface according to the received instructions 365. The output may include displaying data corresponding to the data object, broadcasting data (e.g., audio), or a combination thereof.

Figure 4:
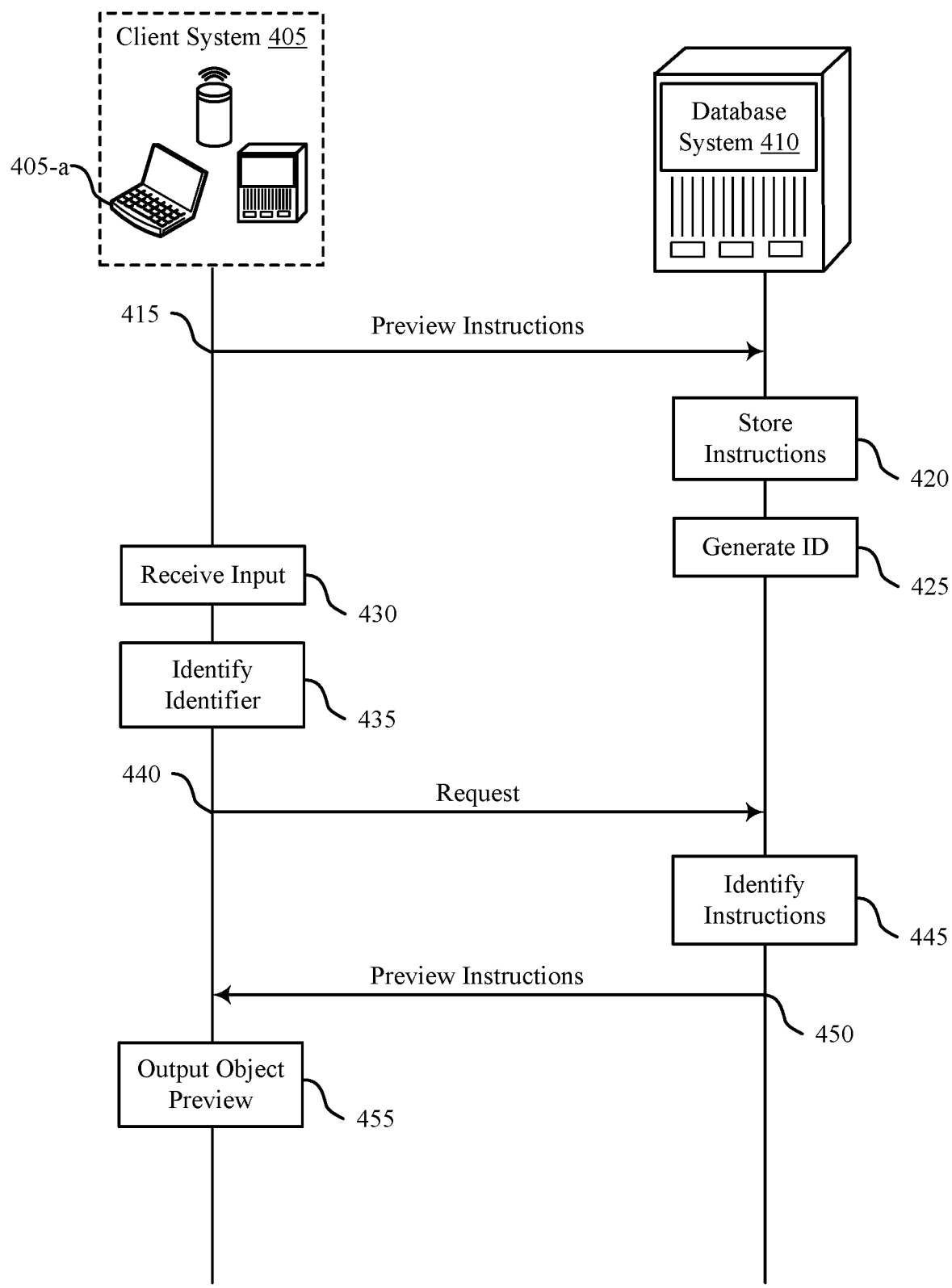
FIG. 4 illustrates an example of a process flow diagram that illustrates configuring dynamic content previews in accordance with aspects of the present disclosure.

FIG. 4 illustrates an example of a process flow diagram 400 that illustrates configuring dynamic content previews in accordance with aspects of the present disclosure. The process flow diagram 400 may implement aspects of system 100 of FIG. 1 and includes a set of client systems 405, which may be examples of devices associated with cloud client 105 of FIG. 1. Example client systems 405 include computing devices, smart devices, virtual assistants, etc. and the client systems 405 may include servers supporting such systems (e.g., search servers, application servers, etc.). The process flow diagram 400 further includes a database system 410, which may be an example of aspects of cloud platform 115 of FIG. 1 and may be an example of aspects of the object preview server 210 of FIG. 2 (e.g., a database system, application server, etc.) and the server 305 of FIG. 3.

At 415, the client system 405 transmits a set of preview instructions to the database system 410, and the database system 410 receives the set of preview instructions. The set of preview instructions may be transmitted responsive to a user configuring a set of instructions at a UI at a user device (e.g., user device 405-a), where the UI is supported by the database system 410 (e.g., an object preview service).

At 420, the database system 410 stores the instructions in a preview library. The preview library may include multiple instructions sets defining renderable object previews of different data object types stored at the database system 410. The database system 410 may store different object types, such as contact objects, business data objects, etc.

At 425, the database system 410 generates a unique identifier for the renderable preview. The unique identifier may be associated with the preview library of the database system 410. In some cases, the unique identifier is a URL as a subdomain of a domain corresponding to the preview library.

At 430, a client system 405 receives input from a user. The input may be a link posted in a chat, a search query, textual input, audio (e.g., voice) input, calendar input, location input, etc. In some cases, the input specifies one or more data object source identifiers corresponding to the database system 410. The client system 405 is authenticated (e.g., via an API) at the database system 410. At 435, the client system 405 identifies an identifier for a preview library of the database system 410 based on the input. The identification may be based on a configuration of the client system. For example, if the input is a link or URL, then a pattern corresponding to the database system may be identified. In another example, the input may be audio input from which the client system 405 infers association with the database system 410. As a specific example, if the input mentions "business data," "profits," or the like, then the client system 405 may infer the source of such data (e.g., the database system 410). Other types of inputs and database system 410 identification conditions are contemplated.

At 440, the client system 405 transmits a request to the database system associated with the data object source identifier. The request may indicate at least the identifier for the preview library and may specify a data object stored at the database system 410. For example, if the input is "ClientOrg.com/contact/John," then the object source identifier may be "ClientOrg," and the object identifier may be "John." Accordingly, the request includes an identification of the preview library corresponding to the object source identifier and an indication of the object. The database system 440 receives the request from the authenticated client system 405, where the request indicates the identifier of the library and at least one data object. The authenticated client system 405 uses an endpoint (e.g., API endpoint) to transmit the request.

At 445, the database system 410 identifies a set of instructions defining a renderable preview of the identified data object. The identification may be based at least in part on the UI configuration of the client system (e.g., audio display, visual display, both) and the request (e.g., whether the request specifies an authentication level, identifies some other parameters, etc.). The instructions include fields populated with data of the at least one data object specified in the request.

At 450, the database system 410 transmits the identified set of instructions defining the renderable preview of the identified data object. The instructions include the fields populated with the object data. The client system 405 receives the set of instructions defining the preview of the data object. At 455, the client system 405 outputs (e.g., displays, broadcasts, etc.) the renderable preview of the at least one data object at a UI of the authenticated client system according to the received set of instructions.

Figure 5:
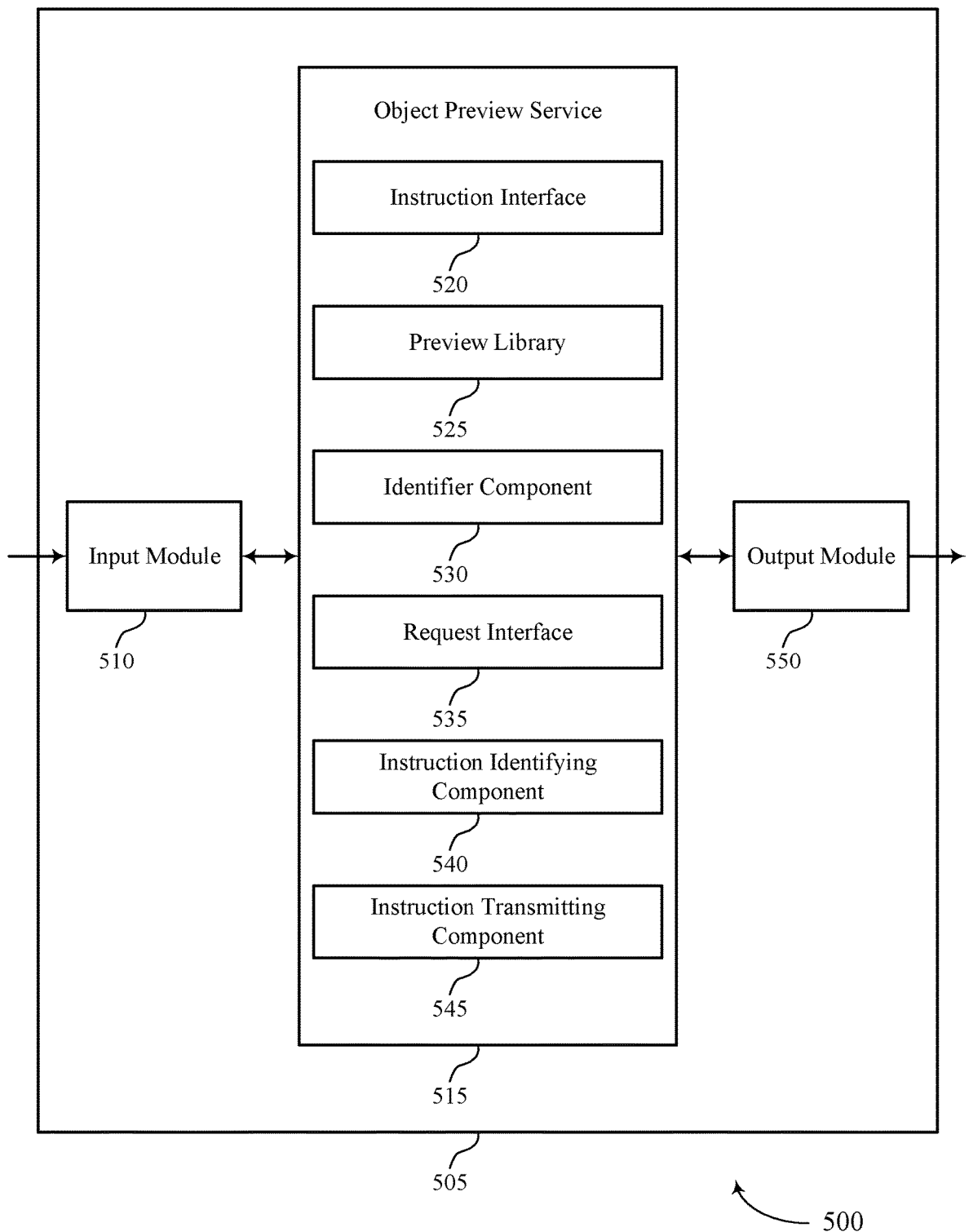
FIG. 5 shows a block diagram of an apparatus that supports configuring dynamic content previews in accordance with aspects of the present disclosure.

FIG. 5 shows a block diagram 500 of an apparatus 505 that supports configuring dynamic content previews in accordance with aspects of the present disclosure. The apparatus 505 may include an input module 510, an object preview service 515, and an output module 550. The apparatus 505 may also include a processor. Each of these components may be in communication with one another (e.g., via one or more buses). In some cases, the apparatus 505 may be an example of a user terminal, a database system, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the object preview service 515 to support configuring dynamic content previews. In some cases, the input module 510 may be a component of an input/output (I/O) controller 715 as described with reference to FIG. 7.

The object preview service 515 may include an instruction interface 520, a preview library 525, an identifier component 530, a request interface 535, an instruction identifying component 540, and an instruction transmitting component 545. The object preview service 515 may be an example of aspects of the object preview service 605 or 710 described with reference to FIGS. 6 and 7.

The object preview service 515 and/or at least some of its various sub-components may be implemented in hardware, software executed by a processor, firmware, or any combination thereof. If implemented in software executed by a processor, the functions of the object preview service 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The object preview service 515 and/or at least some of its various sub-components may be physically located at various positions, including being distributed such that portions of functions are implemented at different physical locations by one or more physical devices. In some examples, the object preview service 515 and/or at least some of its various sub-components may be a separate and distinct component in accordance with various aspects of the present disclosure. In other examples, the object preview service 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The instruction interface 520 may receive, at a database system, a first set of instructions defining a renderable preview of a data object of a set of data objects stored at a database system, the first set of instructions being generated based on a selection, by a user, of displayable aspects of the data object stored at the database system.

The preview library 525 may store the first set of instructions in a preview library of the database system, the preview library including a set of sets of instructions defining renderable previews of different data object types of the set of data objects stored in the database system. The identifier component 530 may generate a unique identifier for the renderable preview, the unique identifier being associated with an identifier of the preview library of the database system.

The request interface 535 may receive, at the database system and from an authenticated client system, a request indicating at least the identifier of the preview library and at least one data object of the set of data objects stored at the database system, the authenticated client system using an endpoint exposed by the database system to transmit the request.

The instruction identifying component 540 may identify, based on a UI configuration of the authenticated client system and the request, a set of instructions defining a renderable preview of the identified at least one data object of the set of data objects, the identified set of instructions including fields including data of the at least one data object.

The instruction transmitting component 545 may transmit, to the authenticated client system, the identified set of instructions defining the renderable preview of the identified at least one data object including the fields including the data of the at least one data object.

The output module 550 may manage output signals for the apparatus 505. For example, the output module 550 may receive signals from other components of the apparatus 505, such as the object preview service 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
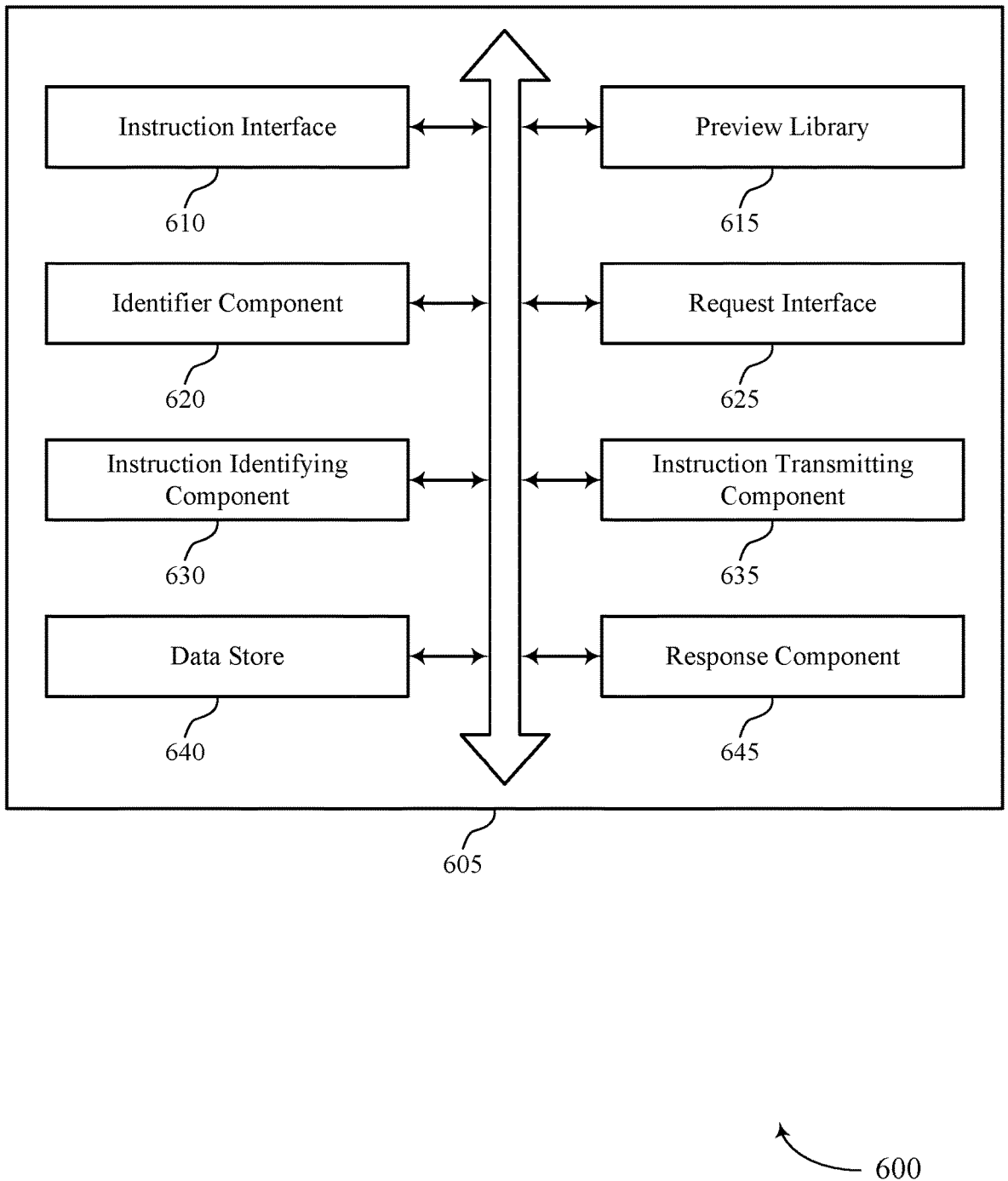
FIG. 6 shows a block diagram of a dynamic content preview component that supports configuring dynamic content previews in accordance with aspects of the present disclosure.

FIG. 6 shows a block diagram 600 of an object preview service 605 that supports configuring dynamic content previews in accordance with aspects of the present disclosure. The object preview service 605 may be an example of aspects of an object preview service 515 or an object preview service 710 described herein. The object preview service 605 may include an instruction interface 610, a preview library 615, an identifier component 620, a request interface 625, an instruction identifying component 630, an instruction transmitting component 635, a data store 640, and a response component 645. Each of these modules may communicate, directly or indirectly, with one another (e.g., via one or more buses).

The instruction interface 610 may receive, at a database system, a first set of instructions defining a renderable preview of a data object of a set of data objects stored at a database system, the first set of instructions being generated based on a selection, by a user, of displayable aspects of the data object stored at the database system.

The preview library 615 may store the first set of instructions in a preview library of the database system, the preview library including a set of sets of instructions defining renderable previews of different data object types of the set of data objects stored in the database system. In some cases, the preview library includes sets of instructions corresponding to the renderable preview for a set of authenticated client system types.

The identifier component 620 may generate a unique identifier for the renderable preview, the unique identifier being associated with an identifier of the preview library of the database system.

The request interface 625 may receive, at the database system and from an authenticated client system, a request indicating at least the identifier of the preview library and at least one data object of the set of data objects stored at the database system, the authenticated client system using an endpoint exposed by the database system to transmit the request. In some cases, the request indicating the unique identifier of the renderable preview is generated based on an input by a user of the client system. In some cases, the input includes audio input, textual input, or both.

In some cases, the request indicating the unique identifier of the renderable preview is generated based on contextual information associated with a user of the client system. In some cases, the contextual information includes calendar information, behavioral information, geolocation information, or a combination thereof. In some cases, the identified set of instructions include instructions defining actionable content when rendered at the authenticated client system.

The instruction identifying component 630 may identify, based on a UI configuration of the authenticated client system and the request, a set of instructions defining a renderable preview of the identified at least one data object of the set of data objects, the identified set of instructions including fields including data of the at least one data object. In some examples, the instruction identifying component 630 may identify the set of instructions defining the renderable preview based on an authentication level associated with the authenticated client system. In some examples, the instruction identifying component 630 may override a default set of instructions based on the request, the default set of instructions corresponding to the authenticated client system, where overriding the default set of instructions include modifying the identified set of instructions. In some examples, the instruction identifying component 630 may identify a default set of instructions based on the authenticated client system.

In some cases, the authentication level corresponds to a guest authentication, the identified set of instructions defining a subset of the data of the at least one data object to be rendered at the authenticated client system via the renderable preview. In some cases, the authentication level corresponds to a full authentication. In some cases, the identified set of instructions corresponds to the first set of instructions. In some cases, the identified set of instructions define which data of the data object is included in the renderable preview at the authenticated client system.

The instruction transmitting component 635 may transmit, to the authenticated client system, the identified set of instructions defining the renderable preview of the identified at least one data object including the fields including the data of the at least one data object. The data store 640 may store a plurality of data objects, and the data objects may correspond to a contact, a user, a business, or a combination thereof.

The response component 645 may receive, from the authenticated client system, an indication of activation of the actionable content by the user. In some examples, the response component 645 may execute an operation associated with the actionable content responsive to receiving the indication of activation.

Figure 7:
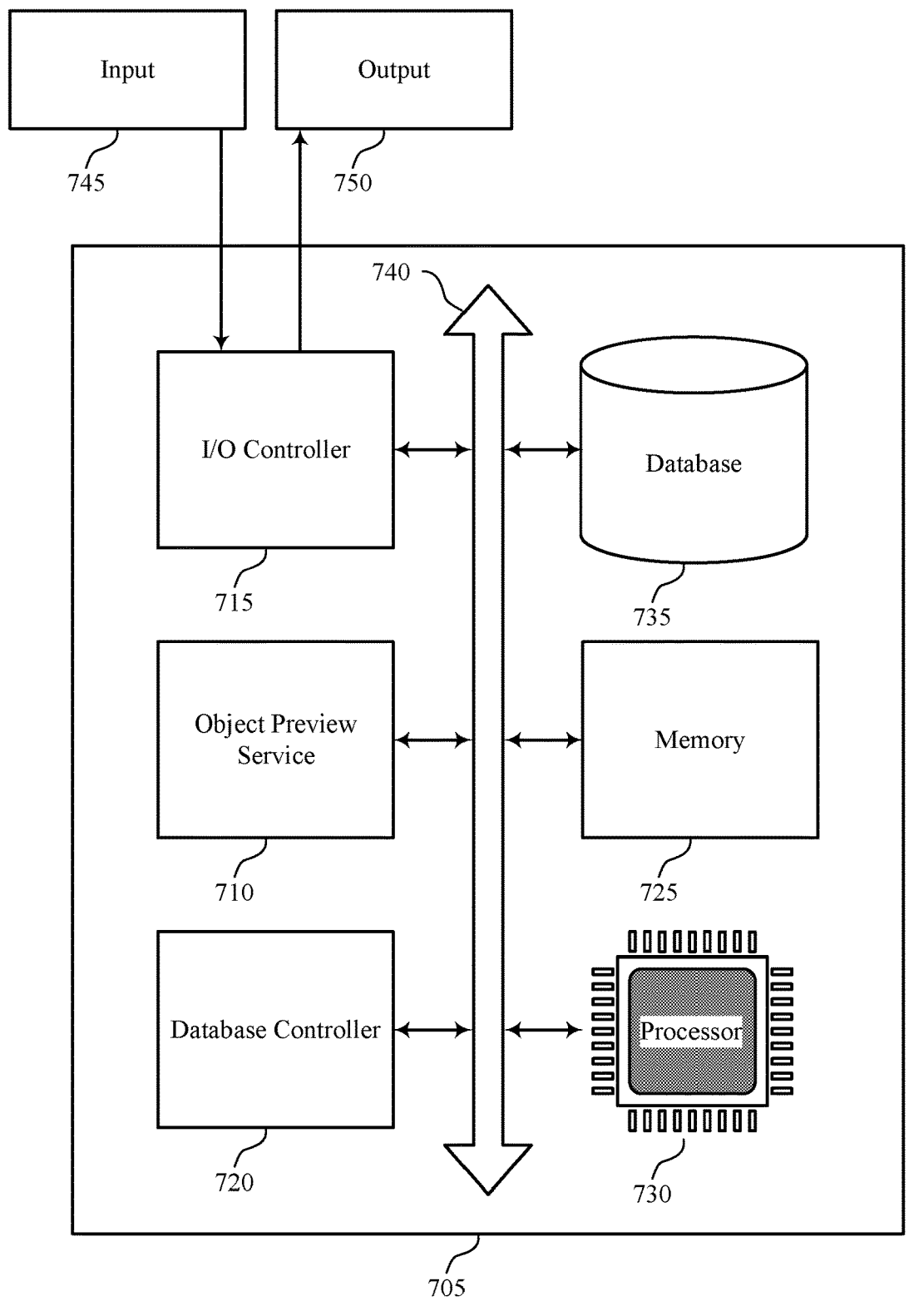
FIG. 7 shows a diagram of a system including a device that supports configuring dynamic content previews in accordance with aspects of the present disclosure.

FIG. 7 shows a diagram of a system 700 including a device 705 that supports configuring dynamic content previews in accordance with aspects of the present disclosure. The device 705 may be an example of or include the components of a database system or an apparatus 505 as described herein. The device 705 may include components for bi-directional data communications including components for transmitting and receiving communications, including an object preview service 710, an I/O controller 715, a database controller 720, memory 725, a processor 730, and a database 735. These components may be in electronic communication via one or more buses (e.g., bus 740).

The object preview service 710 may be an example of an object preview service 515 or 605 as described herein. For example, the object preview service 710 may perform any of the methods or processes described herein with reference to FIGS. 5 and 6. In some cases, the object preview service 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting configuring dynamic content previews).

Figure 8:
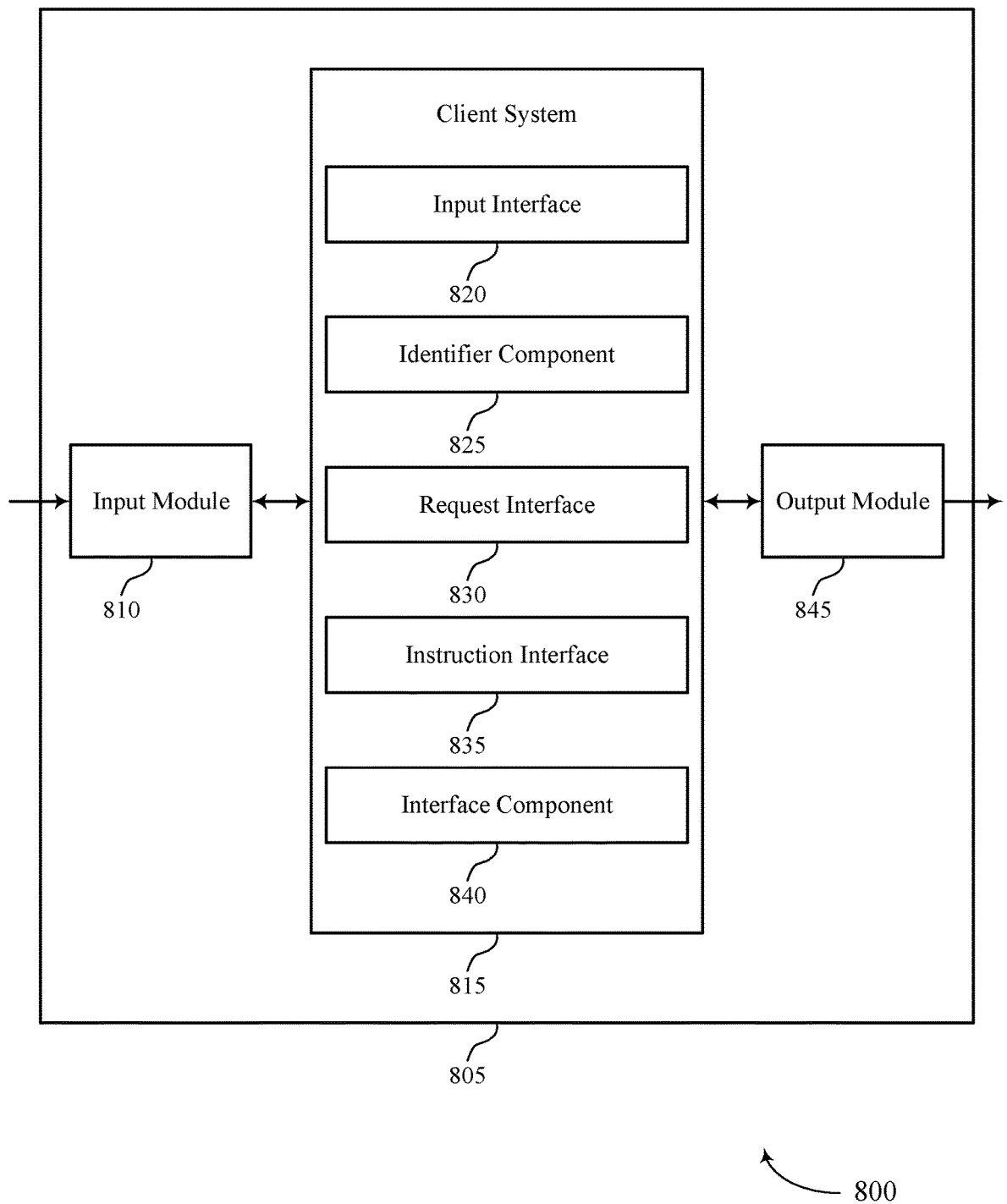
FIG. 8 shows a block diagram of an apparatus that supports configuring dynamic content previews in accordance with aspects of the present disclosure.

FIG. 8 shows a block diagram 800 of an apparatus 805 that supports configuring dynamic content previews in accordance with aspects of the present disclosure. The apparatus 805 may include an input module 810, an client system 815, and an output module 845. The apparatus 805 may also include a processor. Each of these components may be in communication with one another (e.g., via one or more buses). In some cases, the apparatus 805 may be an example of a user terminal, a database system, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the client system 815 to support configuring dynamic content previews. In some cases, the input module 810 may be a component of an input/output (I/O) controller 1015 as described with reference to FIG. 10.

The client system 815 may include an input interface 820, an identifier component 825, a request interface 830, an instruction interface 835, and an interface component 840. The client system 815 may be an example of aspects of the client system 905 or 1010 described with reference to FIGS. 9 and 10.

The client system 815 and/or at least some of its various sub-components may be implemented in hardware, software executed by a processor, firmware, or any combination thereof. If implemented in software executed by a processor, the functions of the client system 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The client system 815 and/or at least some of its various sub-components may be physically located at various positions, including being distributed such that portions of functions are implemented at different physical locations by one or more physical devices. In some examples, the client system 815 and/or at least some of its various sub-components may be a separate and distinct component in accordance with various aspects of the present disclosure. In other examples, the client system 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The input interface 820 may receive, at an authenticated client system, an input specifying a data object source identifier and indicating at least one data object, the client system authenticated at a database system using an endpoint exposed by the database system.

The identifier component 825 may identify an identifier for a preview library of the database system associated with the data object source identifier based on the received input.

The request interface 830 may transmit a request to the database system associated with the data object source identifier, the request indicating at least the identifier for the preview library and the specified data object.

The instruction interface 835 may receive, from the database system and responsive to the transmitted request, a set of instructions defining a renderable preview of the at least one data object, the database system identifying the set of instructions based on the request and the authenticated client system.

The interface component 840 may output the renderable preview of the at least one data object at a UI of the authenticated client system according to the received set of instructions.

The output module 845 may manage output signals for the apparatus 805. For example, the output module 845 may receive signals from other components of the apparatus 805, such as the client system 815, and may transmit these signals to other components or devices. In some specific examples, the output module 845 may transmit output signals for display in a user interface, for storage in a database or data store, for further processing at a server or server cluster, or for any other processes at any number of devices or systems. In some cases, the output module 845 may be a component of an I/O controller 1015 as described with reference to FIG. 10.

Figure 9:
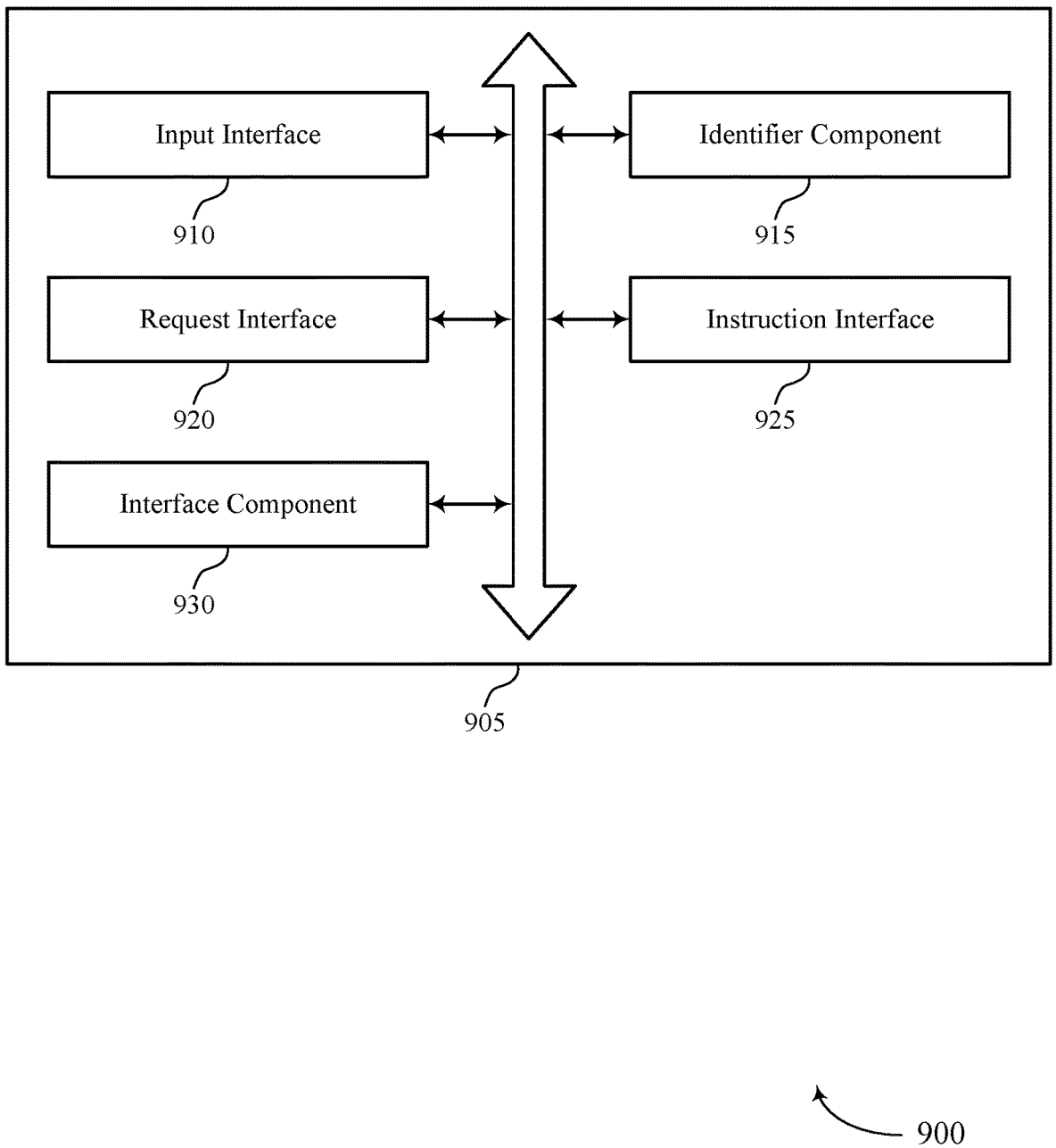
FIG. 9 shows a block diagram of a dynamic content preview component that supports configuring dynamic content previews in accordance with aspects of the present disclosure.

FIG. 9 shows a block diagram 900 of a client system 905 that supports configuring dynamic content previews in accordance with aspects of the present disclosure. The client system 905 may be an example of aspects of a client system 815 or a client system 1010 described herein. The client system 905 may include an input interface 910, an identifier component 915, a request interface 920, an instruction interface 925, and an interface component 930. Each of these modules may communicate, directly or indirectly, with one another (e.g., via one or more buses).

The input interface 910 may receive, at an authenticated client system, an input specifying a data object source identifier and indicating at least one data object, the client system authenticated at a database system using an endpoint exposed by the database system.

The identifier component 915 may identify an identifier for a preview library of the database system associated with the data object source identifier based on the received input.

The request interface 920 may transmit a request to the database system associated with the data object source identifier, the request indicating at least the identifier for the preview library and the specified data object.

The instruction interface 925 may receive, from the database system and responsive to the transmitted request, a set of instructions defining a renderable preview of the at least one data object, the database system identifying the set of instructions based on the request and the authenticated client system.

The interface component 930 may output the renderable preview of the at least one data object at a UI of the authenticated client system according to the received set of instructions.

Figure 10:
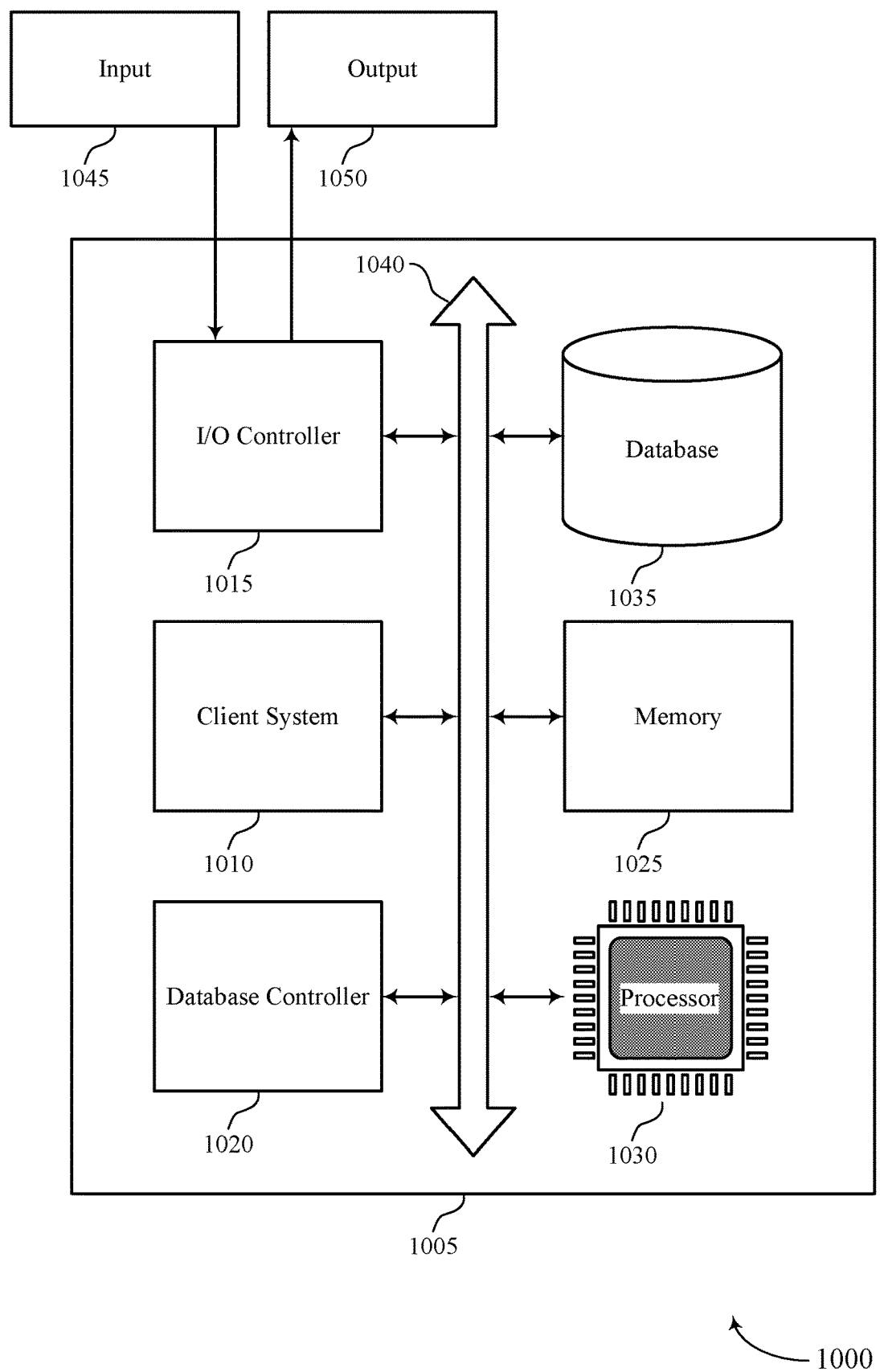
FIG. 10 shows a diagram of a system including a device that supports configuring dynamic content previews in accordance with aspects of the present disclosure.

FIG. 10 shows a diagram of a system 1000 including a device 1005 that supports configuring dynamic content previews in accordance with aspects of the present disclosure. The device 1005 may be an example of or include the components of a user device or an apparatus 805 as described herein. The device 1005 may include components for bi-directional data communications including components for transmitting and receiving communications, including an client system 1010, an I/O controller 1015, a database controller 1020, memory 1025, a processor 1030, and a database 1035. These components may be in electronic communication via one or more buses (e.g., bus 1040).

The client system 1010 may be an example of a client system 815 or 905 as described herein. For example, the client system 1010 may perform any of the methods or processes described herein with reference to FIGS. 8 and 9. In some cases, the client system 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting configuring dynamic content previews).

Figure 11:
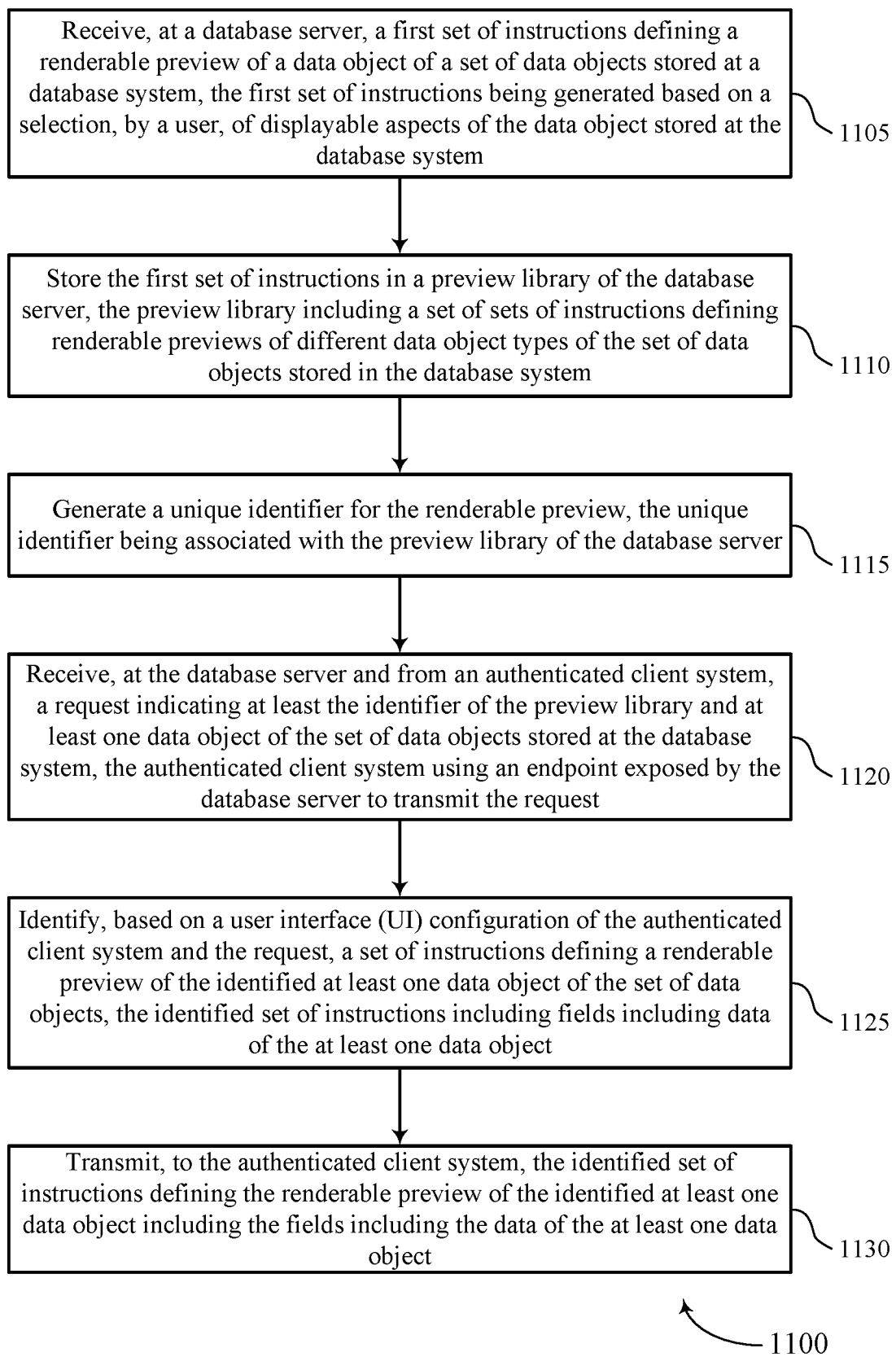
FIGS. 11 through 14 show flowcharts illustrating methods that support configuring dynamic content previews in accordance with aspects of the present disclosure.

FIG. 11 shows a flowchart illustrating a method 1100 that supports configuring dynamic content previews in accordance with aspects of the present disclosure. The operations of method 1100 may be implemented by a database system or its components as described herein. For example, the operations of method 1100 may be performed by object preview service as described with reference to FIGS. 5 through 7. In some examples, a database system may execute a set of instructions to control the functional elements of the database system to perform the functions described herein. Additionally or alternatively, a database system may perform aspects of the functions described herein using special-purpose hardware.

At 1105, the database system may receive, at a database system, a first set of instructions defining a renderable preview of a data object of a set of data objects stored at a database system, the first set of instructions being generated based on a selection, by a user, of displayable aspects of the data object stored at the database system. The operations of 1105 may be performed according to the methods described herein. In some examples, aspects of the operations of 1105 may be performed by an instruction interface as described with reference to FIGS. 5 through 7.

At 1110, the database system may store the first set of instructions in a preview library of the database system, the preview library including a set of sets of instructions defining renderable previews of different data object types of the set of data objects stored in the database system. The operations of 1110 may be performed according to the methods described herein. In some examples, aspects of the operations of 1110 may be performed by a preview library as described with reference to FIGS. 5 through 7.

At 1115, the database system may generate a unique identifier for the renderable preview, the unique identifier being associated with an identifier of the preview library of the database system. The operations of 1115 may be performed according to the methods described herein. In some examples, aspects of the operations of 1115 may be performed by an identifier component as described with reference to FIGS. 5 through 7.

At 1120, the database system may receive, at the database system and from an authenticated client system, a request indicating at least the identifier of the preview library and at least one data object of the set of data objects stored at the database system, the authenticated client system using an endpoint exposed by the database system to transmit the request. The operations of 1120 may be performed according to the methods described herein. In some examples, aspects of the operations of 1120 may be performed by a request interface as described with reference to FIGS. 5 through 7.

At 1125, the database system may identify, based on a UI configuration of the authenticated client system and the request, a set of instructions defining a renderable preview of the identified at least one data object of the set of data objects, the identified set of instructions including fields including data of the at least one data object. The operations of 1125 may be performed according to the methods described herein. In some examples, aspects of the operations of 1125 may be performed by an instruction identifying component as described with reference to FIGS. 5 through 7.

At 1130, the database system may transmit, to the authenticated client system, the identified set of instructions defining the renderable preview of the identified at least one data object including the fields including the data of the at least one data object. The operations of 1130 may be performed according to the methods described herein. In some examples, aspects of the operations of 1130 may be performed by an instruction transmitting component as described with reference to FIGS. 5 through 7.

Figure 12:
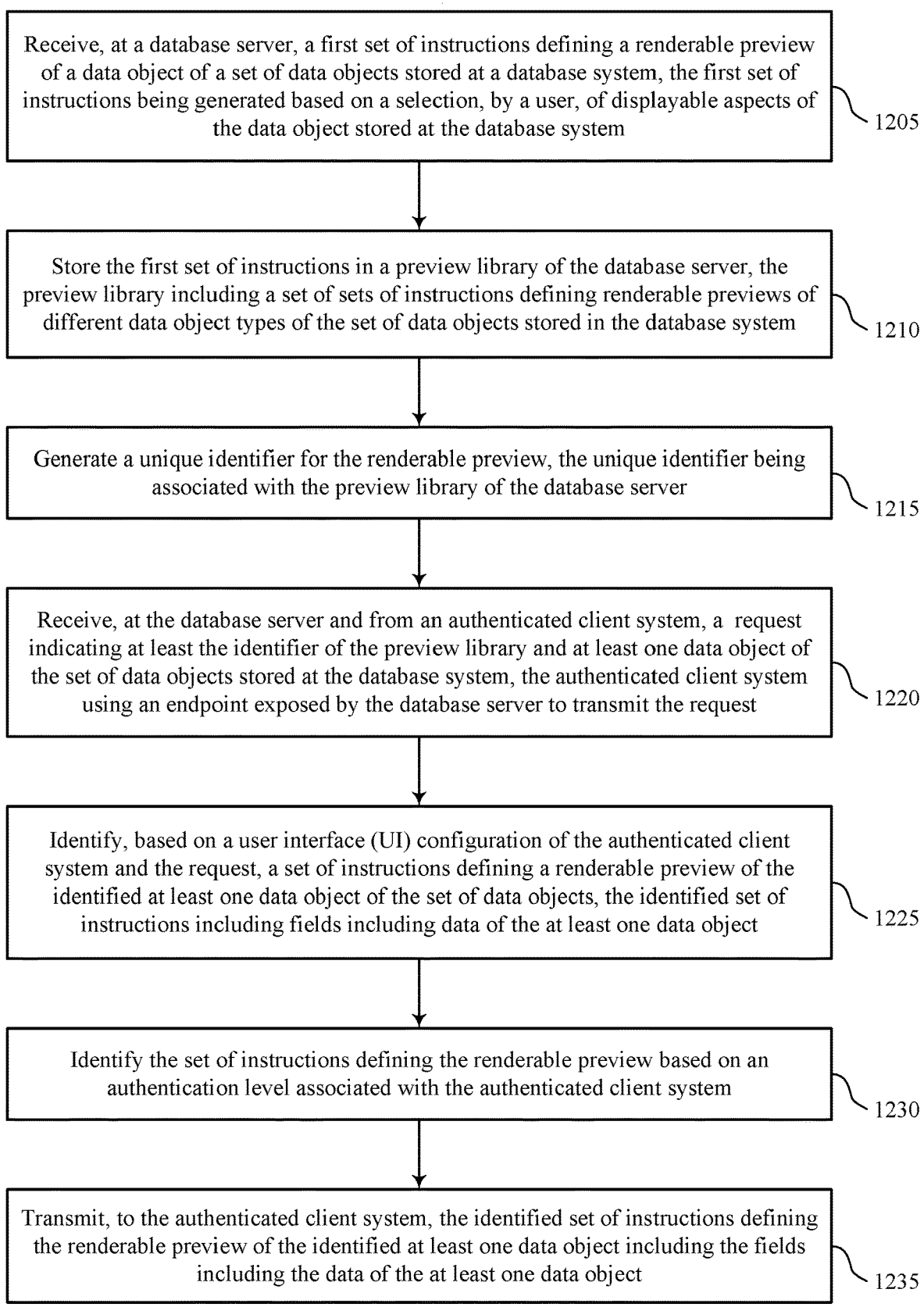

FIG. 12 shows a flowchart illustrating a method 1200 that supports configuring dynamic content previews in accordance with aspects of the present disclosure. The operations of method 1200 may be implemented by a database system or its components as described herein. For example, the operations of method 1200 may be performed by an object preview service as described with reference to FIGS. 5 through 7. In some examples, a database system may execute a set of instructions to control the functional elements of the database system to perform the functions described herein. Additionally or alternatively, a database system may perform aspects of the functions described herein using special-purpose hardware.

At 1205, the database system may receive, at a database system, a first set of instructions defining a renderable preview of a data object of a set of data objects stored at a database system, the first set of instructions being generated based on a selection, by a user, of displayable aspects of the data object stored at the database system. The operations of 1205 may be performed according to the methods described herein. In some examples, aspects of the operations of 1205 may be performed by an instruction interface as described with reference to FIGS. 5 through 7.

At 1210, the database system may store the first set of instructions in a preview library of the database system, the preview library including a set of sets of instructions defining renderable previews of different data object types of the set of data objects stored in the database system. The operations of 1210 may be performed according to the methods described herein. In some examples, aspects of the operations of 1210 may be performed by a preview library as described with reference to FIGS. 5 through 7.

At 1215, the database system may generate a unique identifier for the renderable preview, the unique identifier being associated with an identifier of the preview library of the database system. The operations of 1215 may be performed according to the methods described herein. In some examples, aspects of the operations of 1215 may be performed by an identifier component as described with reference to FIGS. 5 through 7.

At 1220, the database system may receive, at the database system and from an authenticated client system, a request indicating at least the identifier of the preview library and at least one data object of the set of data objects stored at the database system, the authenticated client system using an endpoint exposed by the database system to transmit the request. The operations of 1220 may be performed according to the methods described herein. In some examples, aspects of the operations of 1220 may be performed by a request interface as described with reference to FIGS. 5 through 7.

At 1225, the database system may identify, based on a UI configuration of the authenticated client system and the request, a set of instructions defining a renderable preview of the identified at least one data object of the set of data objects, the identified set of instructions including fields including data of the at least one data object. The operations of 1225 may be performed according to the methods described herein. In some examples, aspects of the operations of 1225 may be performed by an instruction identifying component as described with reference to FIGS. 5 through 7.

At 1230, the database system may identify the set of instructions defining the renderable preview based on an authentication level associated with the authenticated client system. The operations of 1230 may be performed according to the methods described herein. In some examples, aspects of the operations of 1230 may be performed by an instruction identifying component as described with reference to FIGS. 5 through 7.

At 1235, the database system may transmit, to the authenticated client system, the identified set of instructions defining the renderable preview of the identified at least one data object including the fields including the data of the at least one data object. The operations of 1235 may be performed according to the methods described herein. In some examples, aspects of the operations of 1235 may be performed by an instruction transmitting component as described with reference to FIGS. 5 through 7.

Figure 13:
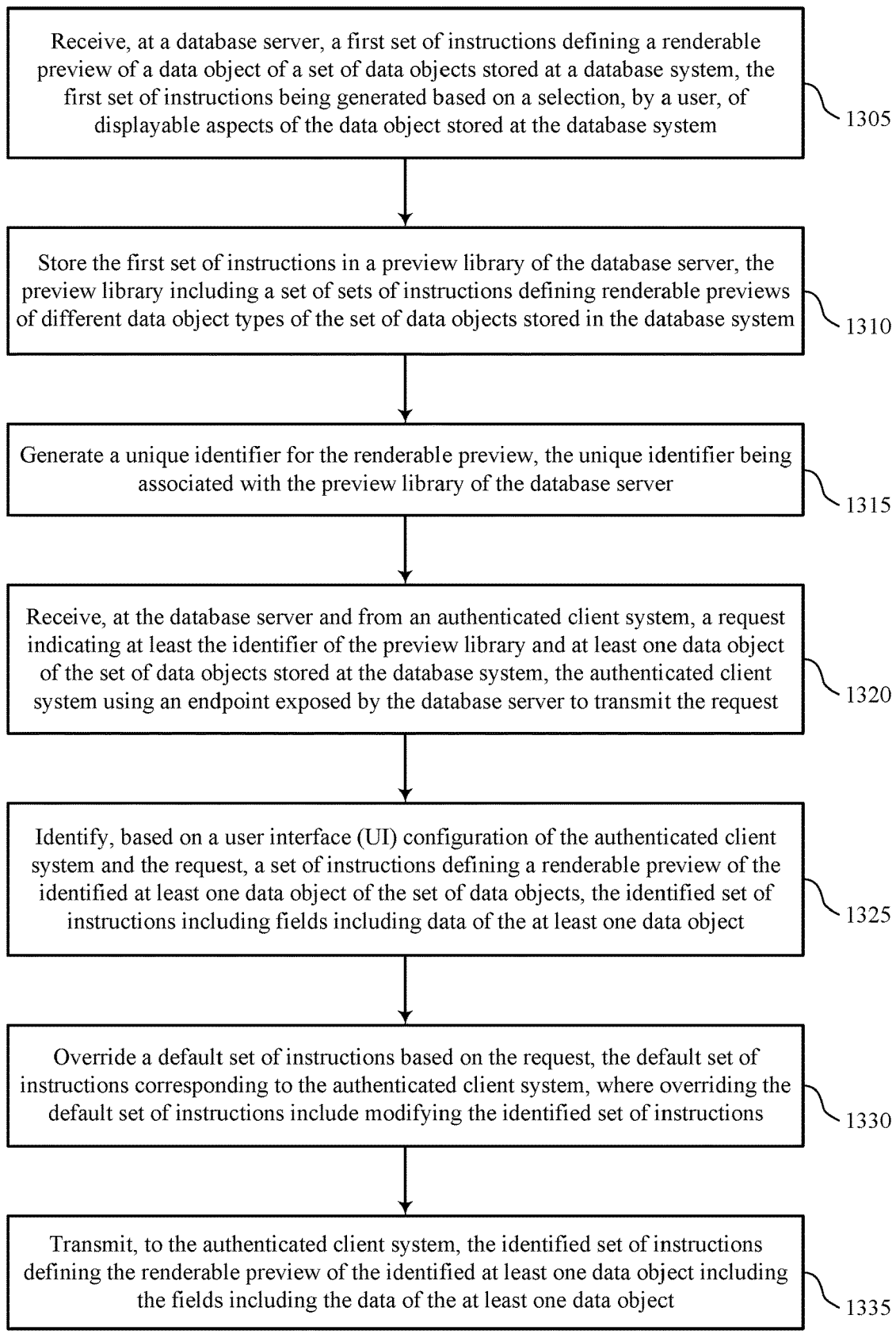

FIG. 13 shows a flowchart illustrating a method 1300 that supports configuring dynamic content previews in accordance with aspects of the present disclosure. The operations of method 1300 may be implemented by a database system or its components as described herein. For example, the operations of method 1300 may be performed by an object preview service as described with reference to FIGS. 5 through 7. In some examples, a database system may execute a set of instructions to control the functional elements of the database system to perform the functions described herein. Additionally or alternatively, a database system may perform aspects of the functions described herein using special-purpose hardware.

At 1305, the database system may receive, at a database system, a first set of instructions defining a renderable preview of a data object of a set of data objects stored at a database system, the first set of instructions being generated based on a selection, by a user, of displayable aspects of the data object stored at the database system. The operations of 1305 may be performed according to the methods described herein. In some examples, aspects of the operations of 1305 may be performed by an instruction interface as described with reference to FIGS. 5 through 7.

At 1310, the database system may store the first set of instructions in a preview library of the database system, the preview library including a set of sets of instructions defining renderable previews of different data object types of the set of data objects stored in the database system. The operations of 1310 may be performed according to the methods described herein. In some examples, aspects of the operations of 1310 may be performed by a preview library as described with reference to FIGS. 5 through 7.

At 1315, the database system may generate a unique identifier for the renderable preview, the unique identifier being associated with an identifier of the preview library of the database system. The operations of 1315 may be performed according to the methods described herein. In some examples, aspects of the operations of 1315 may be performed by an identifier component as described with reference to FIGS. 5 through 7.

At 1320, the database system may receive, at the database system and from an authenticated client system, a request indicating at least the identifier of the preview library and at least one data object of the set of data objects stored at the database system, the authenticated client system using an endpoint exposed by the database system to transmit the request. The operations of 1320 may be performed according to the methods described herein. In some examples, aspects of the operations of 1320 may be performed by a request interface as described with reference to FIGS. 5 through 7.

At 1325, the database system may identify, based on a UI configuration of the authenticated client system and the request, a set of instructions defining a renderable preview of the identified at least one data object of the set of data objects, the identified set of instructions including fields including data of the at least one data object. The operations of 1325 may be performed according to the methods described herein. In some examples, aspects of the operations of 1325 may be performed by an instruction identifying component as described with reference to FIGS. 5 through 7.

At 1330, the database system may override a default set of instructions based on the request, the default set of instructions corresponding to the authenticated client system, where overriding the default set of instructions include modifying the identified set of instructions. The operations of 1330 may be performed according to the methods described herein. In some examples, aspects of the operations of 1330 may be performed by an instruction identifying component as described with reference to FIGS. 5 through 7.

At 1335, the database system may transmit, to the authenticated client system, the identified set of instructions defining the renderable preview of the identified at least one data object including the fields including the data of the at least one data object. The operations of 1335 may be performed according to the methods described herein. In some examples, aspects of the operations of 1335 may be performed by an instruction transmitting component as described with reference to FIGS. 5 through 7.

Figure 14:
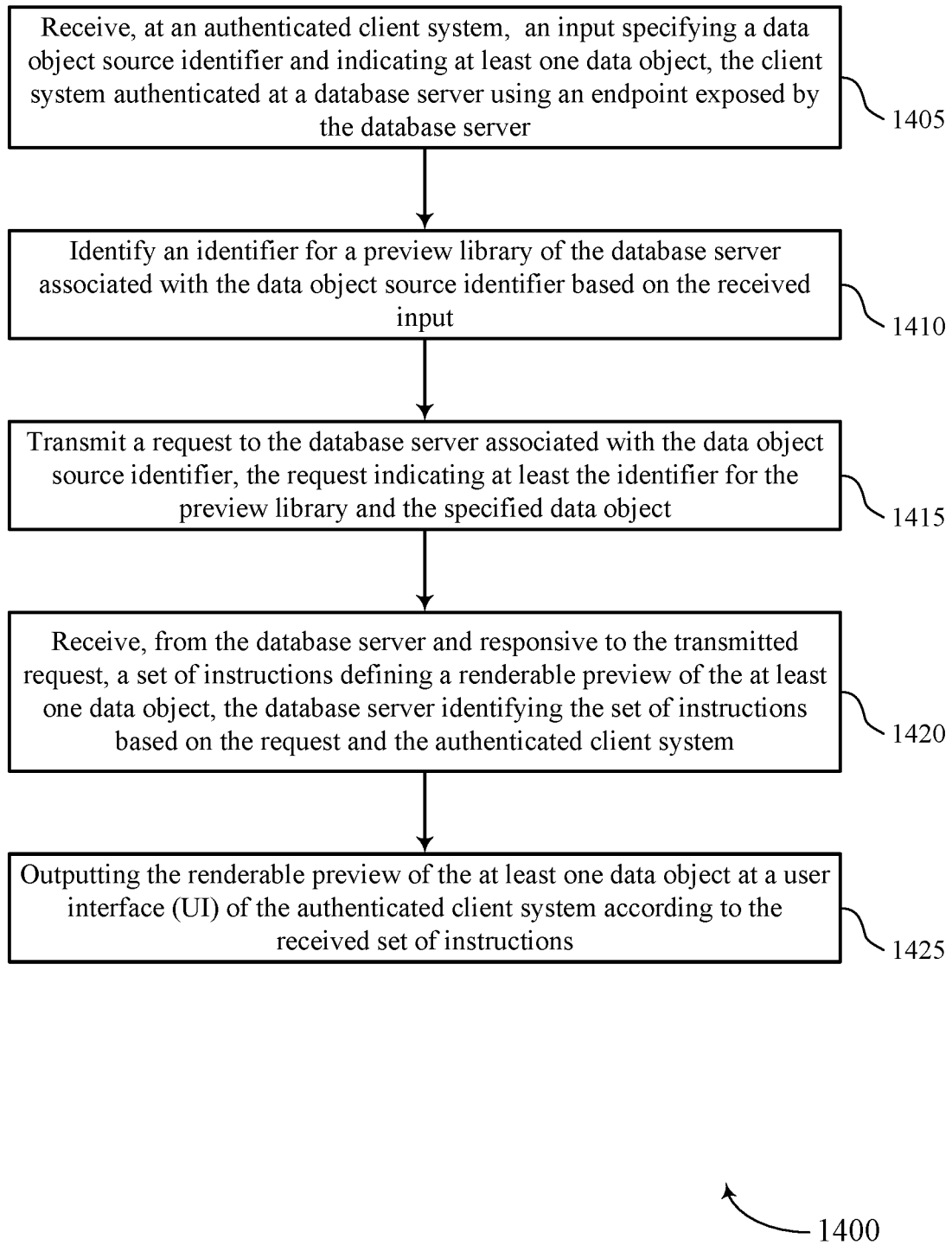

FIG. 14 shows a flowchart illustrating a method 1400 that supports configuring dynamic content previews in accordance with aspects of the present disclosure. The operations of method 1400 may be implemented by a user device or its components as described herein. For example, the operations of method 1400 may be performed by a client system as described with reference to FIGS. 8 through 10. In some examples, a user device may execute a set of instructions to control the functional elements of the user device to perform the functions described herein. Additionally or alternatively, a user device may perform aspects of the functions described herein using special-purpose hardware.

At 1405, the user device may receive, at an authenticated client system, an input specifying a data object source identifier and indicating at least one data object, the client system authenticated at a database system using an endpoint exposed by the database system. The operations of 1405 may be performed according to the methods described herein. In some examples, aspects of the operations of 1405 may be performed by an input interface as described with reference to FIGS. 8 through 10.

At 1410, the user device may identify an identifier for a preview library of the database system associated with the data object source identifier based on the received input. The operations of 1410 may be performed according to the methods described herein. In some examples, aspects of the operations of 1410 may be performed by an identifier component as described with reference to FIGS. 8 through 10.

At 1415, the user device may transmit a request to the database system associated with the data object source identifier, the request indicating at least the identifier for the preview library and the specified data object. The operations of 1415 may be performed according to the methods described herein. In some examples, aspects of the operations of 1415 may be performed by a request interface as described with reference to FIGS. 8 through 10.

At 1420, the user device may receive, from the database system and responsive to the transmitted request, a set of instructions defining a renderable preview of the at least one data object, the database system identifying the set of instructions based on the request and the authenticated client system. The operations of 1420 may be performed according to the methods described herein. In some examples, aspects of the operations of 1420 may be performed by an instruction interface as described with reference to FIGS. 8 through 10.

At 1425, the user device may output the renderable preview of the at least one data object at a UI of the authenticated client system according to the received set of instructions. The operations of 1425 may be performed according to the methods described herein. In some examples, aspects of the operations of 1425 may be performed by an interface component as described with reference to FIGS. 8 through 10.

A method of data processing is described. The method may include receiving, at a database system, a first set of instructions defining a renderable preview of a data object of a set of data objects stored at a database system, the first set of instructions being generated based on a selection, by a user, of displayable aspects of the data object stored at the database system, storing the first set of instructions in a preview library of the database system, the preview library including a set of sets of instructions defining renderable previews of different data object types of the set of data objects stored in the database system, generating a unique identifier for the renderable preview, the unique identifier being associated with an identifier of the preview library of the database system, receiving, at the database system and from an authenticated client system, a request indicating at least the identifier of the preview library and at least one data object of the set of data objects stored at the database system, the authenticated client system using an endpoint exposed by the database system to transmit the request, identifying, based on a UI configuration of the authenticated client system and the request, a set of instructions defining a renderable preview of the identified at least one data object of the set of data objects, the identified set of instructions including fields including data of the at least one data object, and transmitting, to the authenticated client system, the identified set of instructions defining the renderable preview of the identified at least one data object including the fields including the data of the at least one data object.

An apparatus for data processing is described. The apparatus may include a processor, memory in electronic communication with the processor, and instructions stored in the memory. The instructions may be executable by the processor to cause the apparatus to receive, at a database system, a first set of instructions defining a renderable preview of a data object of a set of data objects stored at a database system, the first set of instructions being generated based on a selection, by a user, of displayable aspects of the data object stored at the database system, store the first set of instructions in a preview library of the database system, the preview library including a set of sets of instructions defining renderable previews of different data object types of the set of data objects stored in the database system, generate a unique identifier for the renderable preview, the unique identifier being associated with an identifier of the preview library of the database system, receive, at the database system and from an authenticated client system, a request indicating at least the identifier of the preview library and at least one data object of the set of data objects stored at the database system, the authenticated client system using an endpoint exposed by the database system to transmit the request, identify, based on a UI configuration of the authenticated client system and the request, a set of instructions defining a renderable preview of the identified at least one data object of the set of data objects, the identified set of instructions including fields including data of the at least one data object, and transmit, to the authenticated client system, the identified set of instructions defining the renderable preview of the identified at least one data object including the fields including the data of the at least one data object.

Another apparatus for data processing is described. The apparatus may include means for receiving, at a database system, a first set of instructions defining a renderable preview of a data object of a set of data objects stored at a database system, the first set of instructions being generated based on a selection, by a user, of displayable aspects of the data object stored at the database system, storing the first set of instructions in a preview library of the database system, the preview library including a set of sets of instructions defining renderable previews of different data object types of the set of data objects stored in the database system, generating a unique identifier for the renderable preview, the unique identifier being associated with an identifier of the preview library of the database system, receiving, at the database system and from an authenticated client system, a request indicating at least the identifier of the preview library and at least one data object of the set of data objects stored at the database system, the authenticated client system using an endpoint exposed by the database system to transmit the request, identifying, based on a UI configuration of the authenticated client system and the request, a set of instructions defining a renderable preview of the identified at least one data object of the set of data objects, the identified set of instructions including fields including data of the at least one data object, and transmitting, to the authenticated client system, the identified set of instructions defining the renderable preview of the identified at least one data object including the fields including the data of the at least one data object.

A non-transitory computer-readable medium storing code for data processing is described. The code may include instructions executable by a processor to receive, at a database system, a first set of instructions defining a renderable preview of a data object of a set of data objects stored at a database system, the first set of instructions being generated based on a selection, by a user, of displayable aspects of the data object stored at the database system, store the first set of instructions in a preview library of the database system, the preview library including a set of sets of instructions defining renderable previews of different data object types of the set of data objects stored in the database system, generate a unique identifier for the renderable preview, the unique identifier being associated with an identifier of the preview library of the database system, receive, at the database system and from an authenticated client system, a request indicating at least the identifier of the preview library and at least one data object of the set of data objects stored at the database system, the authenticated client system using an endpoint exposed by the database system to transmit the request, identify, based on a UI configuration of the authenticated client system and the request, a set of instructions defining a renderable preview of the identified at least one data object of the set of data objects, the identified set of instructions including fields including data of the at least one data object, and transmit, to the authenticated client system, the identified set of instructions defining the renderable preview of the identified at least one data object including the fields including the data of the at least one data object.

Some examples of the method, apparatuses, and non-transitory computer-readable medium described herein may further include operations, features, means, or instructions for identifying the set of instructions defining the renderable preview based on an authentication level associated with the authenticated client system.

In some examples of the method, apparatuses, and non-transitory computer-readable medium described herein, the authentication level corresponds to a guest authentication, the identified set of instructions defining a subset of the data of the at least one data object to be rendered at the authenticated client system via the renderable preview.

In some examples of the method, apparatuses, and non-transitory computer-readable medium described herein, the authentication level corresponds to a full authentication.

Some examples of the method, apparatuses, and non-transitory computer-readable medium described herein may further include operations, features, means, or instructions for overriding a default set of instructions based on the request, the default set of instructions corresponding to the authenticated client system, where overriding the default set of instructions include modifying the identified set of instructions.

Some examples of the method, apparatuses, and non-transitory computer-readable medium described herein may further include operations, features, means, or instructions for identifying a default set of instructions based on the authenticated client system.

In some examples of the method, apparatuses, and non-transitory computer-readable medium described herein, the preview library includes sets of instructions corresponding to the renderable preview for a set of authenticated client system types.

In some examples of the method, apparatuses, and non-transitory computer-readable medium described herein, the data object corresponds to a contact, a user, a business, or a combination thereof.

In some examples of the method, apparatuses, and non-transitory computer-readable medium described herein, the renderable preview corresponds to a web-page viewable using a web-browser, the web-page displaying data corresponding to the data object.

In some examples of the method, apparatuses, and non-transitory computer-readable medium described herein, the authenticated client system corresponds to a chat client, a virtual meeting client, a smart speaker, an email client, a website, a search system, or a combination thereof.

In some examples of the method, apparatuses, and non-transitory computer-readable medium described herein, the identified set of instructions corresponds to the first set of instructions.

In some examples of the method, apparatuses, and non-transitory computer-readable medium described herein, the identified set of instructions define which data of the data object may be included in the renderable preview at the authenticated client system.

In some examples of the method, apparatuses, and non-transitory computer-readable medium described herein, the request indicating the unique identifier of the renderable preview may be generated based on an input by a user of the client system.

In some examples of the method, apparatuses, and non-transitory computer-readable medium described herein, the input includes audio input, textual input, or both.

In some examples of the method, apparatuses, and non-transitory computer-readable medium described herein, the request indicating the unique identifier of the renderable preview may be generated based on contextual information associated with a user of the client system.

In some examples of the method, apparatuses, and non-transitory computer-readable medium described herein, the contextual information includes calendar information, behavioral information, geolocation information, or a combination thereof.

In some examples of the method, apparatuses, and non-transitory computer-readable medium described herein, the authenticated client system includes a server supporting a computing device accessible by a user.

In some examples of the method, apparatuses, and non-transitory computer-readable medium described herein, the identified set of instructions include instructions defining actionable content when rendered at the authenticated client system.

Some examples of the method, apparatuses, and non-transitory computer-readable medium described herein may further include operations, features, means, or instructions for receiving, from the authenticated client system, an indication of activation of the actionable content by the user, and executing an operation associated with the actionable content responsive to receiving the indication of activation.

A method of data processing is described. The method may include receiving, at an authenticated client system, an input specifying a data object source identifier and indicating at least one data object, the client system authenticated at a database system using an endpoint exposed by the database system, identifying an identifier for a preview library of the database system associated with the data object source identifier based on the received input, transmitting a request to the database system associated with the data object source identifier, the request indicating at least the identifier for the preview library and the specified data object, receiving, from the database system and responsive to the transmitted request, a set of instructions defining a renderable preview of the at least one data object, the database system identifying the set of instructions based on the request and the authenticated client system, and outputting the renderable preview of the at least one data object at a UI of the authenticated client system according to the received set of instructions.

An apparatus for data processing is described. The apparatus may include a processor, memory in electronic communication with the processor, and instructions stored in the memory. The instructions may be executable by the processor to cause the apparatus to receive, at an authenticated client system, an input specifying a data object source identifier and indicating at least one data object, the client system authenticated at a database system using an endpoint exposed by the database system, identify an identifier for a preview library of the database system associated with the data object source identifier based on the received input, transmit a request to the database system associated with the data object source identifier, the request indicating at least the identifier for the preview library and the specified data object, receive, from the database system and responsive to the transmitted request, a set of instructions defining a renderable preview of the at least one data object, the database system identifying the set of instructions based on the request and the authenticated client system, and output the renderable preview of the at least one data object at a UI of the authenticated client system according to the received set of instructions.

Another apparatus for data processing is described. The apparatus may include means for receiving, at an authenticated client system, an input specifying a data object source identifier and indicating at least one data object, the client system authenticated at a database system using an endpoint exposed by the database system, identifying an identifier for a preview library of the database system associated with the data object source identifier based on the received input, transmitting a request to the database system associated with the data object source identifier, the request indicating at least the identifier for the preview library and the specified data object, receiving, from the database system and responsive to the transmitted request, a set of instructions defining a renderable preview of the at least one data object, the database system identifying the set of instructions based on the request and the authenticated client system, and outputting the renderable preview of the at least one data object at a UI of the authenticated client system according to the received set of instructions.

A non-transitory computer-readable medium storing code for data processing is described. The code may include instructions executable by a processor to receive, at an authenticated client system, an input specifying a data object source identifier and indicating at least one data object, the client system authenticated at a database system using an endpoint exposed by the database system, identify an identifier for a preview library of the database system associated with the data object source identifier based on the received input, transmit a request to the database system associated with the data object source identifier, the request indicating at least the identifier for the preview library and the specified data object, receive, from the database system and responsive to the transmitted request, a set of instructions defining a renderable preview of the at least one data object, the database system identifying the set of instructions based on the request and the authenticated client system, and output the renderable preview of the at least one data object at a UI of the authenticated client system according to the received set of instructions.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a database system, a first set of instructions defining a customized renderable preview of a data object type, the first set of instructions generated based on a selection of displayable aspects of the data object type for a customized display of the data object type for a first client system type and a first authentication level;
   storing the first set of instructions in a preview library of the database system that includes a plurality of sets of instructions defining different customized renderable previews of the data object type and one or more second data object types for one or more client system types and one or more authentication levels;
   generating a unique identifier for the customized renderable preview defined by the first set of instructions, the unique identifier associated with an identifier of the preview library of the database system;
   receiving, at the database system and from an authenticated client system associated with an authentication level and a client system type, a request including the data object type, the identifier of the preview library, and a data object of the data object type, the authenticated client system using an endpoint exposed by the database system to transmit the request;
   selecting, based at least in part on the client system type of the authenticated client system, the authentication level of the authenticated client system, the identifier of the preview library, and the data object type included in the request, a set of instructions from the plurality of sets of instructions included in the preview library;
   identifying a set of fields that correspond to the selected set of instructions and comprise data associated with the data object included in the request; and
   transmitting, to the authenticated client system, the selected set of instructions and the identified set of fields corresponding to the selected set of instructions.

2. The method of claim 1, wherein the authentication level of the authenticated client system corresponds to a guest authentication, the selected set of instructions including a subset of the data associated with the data object to be rendered at the authenticated client system via the customized renderable preview.

3. The method of claim 1, wherein the authentication level of the authenticated client system corresponds to a full authentication.

4. The method of claim 1, further comprising:
   overriding a default set of instructions based at least in part on the request, the default set of instructions corresponding to the authenticated client system, wherein overriding the default set of instructions comprises modifying the first set of instructions.

5. The method of claim 1, further comprising:
   identifying a default set of instructions based at least in part on the authenticated client system.

6. The method of claim 1, wherein the preview library includes sets of instructions defining customized renderable previews for a set of authenticated client system types.

7. The method of claim 1, wherein the data object type corresponds to a contact, a user, a business, or a combination thereof, and wherein the data associated with the data object includes user information.

8. The method of claim 1, wherein the customized renderable preview corresponds to a web-page viewable using a web-browser, the web-page displaying the data associated with the data object.

9. The method of claim 1, wherein the authenticated client system corresponds to a chat client, a virtual meeting client, a smart speaker, an email client, a website, a search system, or a combination thereof.

10. The method of claim 1, wherein the request is generated based at least in part on an input by a user of the authenticated client system.

11. The method of claim 10, wherein the input comprises audio input, textual input, or both.

12. The method of claim 1, wherein the request is generated based at least in part on contextual information associated with a user of the authenticated client system.

13. The method of claim 12, wherein the contextual information comprises calendar information, behavioral information, geolocation information, or a combination thereof.

14. The method of claim 1, wherein the authenticated client system comprises a server supporting a computing device accessible by a user of the authenticated client system.

15. The method of claim 1, wherein the selected set of instructions includes instructions defining actionable content when rendered at the authenticated client system.

16. The method of claim 15, further comprising:
receiving, from the authenticated client system, an indication of activation of the actionable content by a user of the authenticated client system; and
executing an operation associated with the actionable content responsive to receiving the indication of activation.

17. The method of claim 1, further comprising:
receiving, from a second authenticated client system of a second client system type, a second request including the data object, the identifier of the preview library, and the data object type;
selecting, based at least in part on the second client system type of the second authenticated client system and on the second request, a second set of instructions from the plurality of sets of instructions, the second set of instructions including a second set of fields that correspond to the second set of instructions and comprise the data associated with the data object; and
transmitting, to the second authenticated client system, the second set of instructions and the second set of fields.

18. The method of claim 1, further comprising:
generating the different customized renderable previews of the data object type based at least in part on an administrator of the preview library performing a plurality of drag and drop operations, a plurality of sizing operations, and a plurality of grouping operations on a plurality of fields, a plurality of buttons, a plurality of text boxes, and a plurality of graphs at a user interface configured for the preview library.

19. An apparatus for data processing, comprising:
a processor;
memory in electronic communication with the processor; and
instructions stored in the memory and executable by the processor to cause the apparatus to:
receive, at a database system, a first set of instructions defining a customized renderable preview of a data object type, the first set of instructions generated based on a selection of displayable aspects of the data object type for a customized display of the data object type for a first client system type and a first authentication level;
store the first set of instructions in a preview library of the database system that includes a plurality of sets of instructions defining different customized renderable previews of the data object type and one or more second data object types for one or more client system types and one or more authentication levels;
generate a unique identifier for the customized renderable preview defined by the first set of instructions, the unique identifier associated with an identifier of the preview library of the database system;
receive, at the database system and from an authenticated client system associated with an authentication level and a client system type, a request including the data object type, the identifier of the preview library, and a data object of the data object type, the authenticated client system using an endpoint exposed by the database system to transmit the request;
select, based at least in part on the client system type of the authenticated client system, the authentication level of the authenticated client system, the identifier of the preview library, and the data object type included in the request, a set of instructions from the plurality of sets of instructions included in the preview library;
identify a set of fields that correspond to the selected set of instructions and comprise data associated with the data object included in the request; and
transmit, to the authenticated client system, the selected set of instructions and the identified set of fields corresponding to the selected set of instructions.

20. A non-transitory computer-readable medium storing code for data processing, the code comprising instructions executable by a processor to:
receive, at a database system, a first set of instructions defining a customized renderable preview of a data object type, the first set of instructions generated based on a selection of displayable aspects of the data object type for a customized display of the data object type for a first client system type and a first authentication level;
store the first set of instructions in a preview library of the database system that includes a plurality of sets of instructions defining different customized renderable previews of the data object type and one or more second data object types for one or more client system types and one or more authentication levels;
generate a unique identifier for the customized renderable preview defined by the first set of instructions, the unique identifier associated with an identifier of the preview library of the database system;
receive, at the database system and from an authenticated client system associated with an authentication level and a client system type, a request including the data object type, the identifier of the preview library, and a data object of the data object type, the authenticated client system using an endpoint exposed by the database system to transmit the request;
select, based at least in part on the client system type of the authenticated client system, the authentication level of the authenticated client system, the identifier of the preview library, and the data object type included in the request, a set of instructions from the plurality of sets of instructions included in the preview library;
identify a set of fields that correspond to the selected set of instructions and comprise data associated with the data object included in the request; and transmit, to the authenticated client system, the selected set of instructions and the identified set of fields corresponding to the selected set of instructions.

* * * * *